(12) United States Patent
Tang

(10) Patent No.: US 11,238,296 B2
(45) Date of Patent: Feb. 1, 2022

(54) SAMPLE ACQUISITION METHOD, TARGET DETECTION MODEL GENERATION METHOD, TARGET DETECTION METHOD, COMPUTING DEVICE AND COMPUTER READABLE MEDIUM

(71) Applicant: BOE TECHNOLOGY GROUP CO., LTD., Beijing (CN)

(72) Inventor: Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 160 days.

(21) Appl. No.: 16/605,752

(22) PCT Filed: Feb. 3, 2019

(86) PCT No.: PCT/CN2019/074668
§ 371 (c)(1),
(2) Date: Oct. 16, 2019

(87) PCT Pub. No.: WO2019/158015
PCT Pub. Date: Aug. 22, 2019

(65) Prior Publication Data
US 2020/0151484 A1    May 14, 2020

(30) Foreign Application Priority Data
Feb. 13, 2018    (CN) .......................... 201810149833.2

(51) Int. Cl.
*G06K 9/20* (2006.01)
*G06K 9/62* (2006.01)
*G06K 9/00* (2006.01)

(52) U.S. Cl.
CPC ......... *G06K 9/2063* (2013.01); *G06K 9/6227* (2013.01); *G06K 9/6257* (2013.01);
(Continued)

(58) Field of Classification Search
None
See application file for complete search history.

(56) References Cited

U.S. PATENT DOCUMENTS

| 9,443,320 | B1 * | 9/2016 | Gaidon | G06K 9/3233 |
| 2007/0165951 | A1 * | 7/2007 | Akahori | G06K 9/00281 382/195 |

(Continued)

FOREIGN PATENT DOCUMENTS

| CN | 101290660 A | 10/2008 |
| CN | 103902968 A | 7/2014 |

(Continued)

OTHER PUBLICATIONS

International Search Report received for PCT Patent Application No. PCT/CN2019/074668, dated May 6, 2019, 5 pages (2 pages of English Translation and 3 pages of Original Document).
(Continued)

*Primary Examiner* — David Perlman
(74) *Attorney, Agent, or Firm* — Womble Bond Dickinson (US) LLP

(57) ABSTRACT

The present disclosure discloses a sample acquisition method, a target detection model generation method, a target detection method, a computing device, and a computer readable medium. The sample acquisition method includes: adding a perturbation to a pre-marked sample original box in an original image to obtain a sample selection box, wherein an image framed by the sample original box contains a target; and extracting an image framed by the sample selection box as a sample. The technical solutions of the present disclosure can effectively increase the number of the samples that can be acquired in the original image, and
(Continued)

– – – Positive sample original box
......... Positive sample perturbation box/Positive sample selection box adding a background to the samples can effectively improve the recognition accuracy of the trained target detection model.

15 Claims, 8 Drawing Sheets

(52) U.S. Cl.
CPC ....... *G06K 9/6265* (2013.01); *G06K 9/00369* (2013.01); *G06K 2209/21* (2013.01)

(56) References Cited

U.S. PATENT DOCUMENTS

| | | | |
|---|---|---|---|
| 2007/0237387 A1 | 10/2007 | Avidan et al. | |
| 2012/0089545 A1* | 4/2012 | Mei ..................... | G06K 9/6257 706/20 |
| 2013/0094701 A1 | 4/2013 | Huang | |
| 2017/0017859 A1 | 1/2017 | Uchiyama | |

FOREIGN PATENT DOCUMENTS

| | | |
|---|---|---|
| CN | 105095857 A | 11/2015 |
| CN | 105426870 A | 3/2016 |
| CN | 106295502 A | 1/2017 |
| CN | 106778452 A | 5/2017 |
| CN | 107301378 A | 10/2017 |
| CN | 107463879 A | 12/2017 |

OTHER PUBLICATIONS

International Preliminary Report on Patentability received for PCT Patent Application No. PCT/CN2019/074668, dated Aug. 27, 2020, 10 pages (6 pages of English Translation and 4 pages of Original Document).
Kong et al., "Design of coupled strong classifiers in AdaBoost framework and its application to pedestrian detection", Pattern Recognition Letters, vol. 68, 2015, pp. 63-69.
Office Action received for Chinese Patent Application No. 201810149833.2, dated Oct. 10, 2020, 18 pages (9 pages of English Translation and 9 pages of Office Action).
Written Opinion received for PCT Patent Application No. PCT/CN2019/074668, dated May 6, 2019, 7 pages (4 pages of English Translation and 3 pages of Original Document).
Zhang et al., "Joint Face Detection and Alignment Using Multitask Cascaded Convolutional Networks", IEEE Signal Processing Letters, vol. 23, No. 10, Oct. 2016, pp. 1499-1503.
Supplementary European Search Report and Search Opinion received for EP Patent Application No. 19753684.0, dated Oct. 12, 2021, 8 pages.

\* cited by examiner

SAMPLE ACQUISITION METHOD, TARGET DETECTION MODEL GENERATION METHOD, TARGET DETECTION METHOD, COMPUTING DEVICE AND COMPUTER READABLE MEDIUM

CROSS-REFERENCE TO RELATED APPLICATIONS

The present application is a 35 U.S.C. 371 national stage application of PCT International Application No. PCT/CN2019/074668, filed on Feb. 3, 2019, which claims the priority of Chinese Patent Application No. 201810149833.2, filed on Feb. 13, 2018, the entire disclosures of which are incorporated herein by reference.

TECHNICAL FIELD

The present disclosure relates to the field of intelligent recognition technologies, and in particular, to a sample acquisition method, a target detection model generation method, a target detection method, a computing device, and a computer readable medium.

BACKGROUND

Target detection is an important research direction in the field of computer vision. It involves automatically detecting a target contained in a visual image captured by a camera by intelligently analyzing the image. Target detection has a wide range of applications in the fields of vehicle assisted driving, intelligent monitoring, and intelligent robots.

In an existing target detection process, a classifier is often trained based on positive samples and negative samples that are acquired in advance, and then an image for detection is recognized with the classifier to detect whether a target is contained in the image for detection. In such a target detection process, the number and quality of the selection of the positive samples may affect the recognition accuracy of the classifier to some extent.

The existing positive sample selection is often done by artificially marking a positive sample identification box in an original image, with the positive sample identification box exactly framing a complete target (without containing a background).

SUMMARY

According to some embodiments of the present disclosure, a sample acquisition method is provided. The sample acquisition method may comprise: adding a perturbation to a pre-marked sample original box in an original image to obtain a sample selection box, wherein an image framed by the sample original box contains a target; and extracting an image framed by the sample selection box as a sample.

In an embodiment, the adding the perturbation to the sample original box may comprise: adding a random perturbation to a center position of the sample original box, and/or a width of the sample original box, and/or a height of the sample original box to obtain a sample perturbation box, wherein the sample perturbation box serves as the sample selection box.

In an embodiment, the image framed by the sample original box may contain a complete image of the target or a partial image of the target.

According to some embodiments of the present disclosure, a target detection model generation method is provided. The target detection model generation method may comprise: acquiring a plurality of positive samples from an original image using the sample acquisition method as described above; acquiring from the original image a plurality of images that do not contain the target as negative samples; and generating a target detection model using a preset classification model algorithm according to the plurality of positive samples and the plurality of negative samples that were acquired.

In an embodiment, the generating the target detection model using the preset classification model algorithm according to the plurality of positive samples and the plurality of negative samples that were acquired may comprise: normalizing each of the plurality of positive samples and each of the plurality of negative samples; performing, with a preset feature extraction algorithm, feature vector extraction on each of the positive samples and each of the negative samples that were normalized to obtain a positive sample feature training set and a negative sample feature training set, wherein the positive sample feature training set comprises extracted feature vectors of all the positive samples, and the negative sample feature training set comprises extracted feature vectors of all the negative samples; and training a plurality of weak classifiers according to the positive sample feature training set and the negative sample feature training set, wherein all the plurality of weak classifiers form the target detection model.

In an embodiment, the training the plurality of weak classifiers according to the positive sample feature training set and the negative sample feature training set comprises:

S1, initializing respective detection scores and weights corresponding to respective ones of the positive sample feature vectors in the positive sample feature training set, initializing respective detection scores and weights corresponding to respective ones of the negative sample feature vectors in the negative sample feature training set, and initializing quantity of the weak classifiers as t=0;

S2, setting up a storage structure and placing a root node into the storage structure, wherein the root node has a depth of 1, and the root node contains all the positive sample feature vectors and all the negative sample feature vectors;

S3, detecting whether there is an unprocessed node in the storage structure, proceeding to step S7 upon detection that there is no unprocessed node in the storage structure, and proceeding to step S4 otherwise;

S4, retrieving a node from the storage structure, determining whether the node is splittable, proceeding to step S5 upon determination that the node is splittable, and proceeding to step S3 otherwise;

S5, determining a feature attribute and its corresponding feature threshold that are to be selected for splitting of the node;

S6, splitting all the feature vectors in the node into a left subset and a right subset according to the feature attribute and its corresponding feature threshold that were determined, adding two new nodes as child nodes of the node that respectively contain the left subset and the right subset, adding the two new nodes into the storage structure, and then proceeding to step S4;

S7, recording relevant information of all nodes to complete training of a weak classifier;

S8, executing t=t+1, determining whether t is greater than a preset threshold T, ending the training of the plurality of weak classifiers upon determination that t is greater than T, and proceeding to step S9 otherwise; and S9, updating, with the weak classifier for which the training is currently completed, the detection scores and the weights of the respective ones of the positive sample feature vectors in the positive sample feature training set and the respective ones of the negative sample feature vectors in the negative sample feature training set, and proceeding to step S2 with the detection scores and weights that were updated.

In an embodiment, the following may be further comprised between step S1 and step S3: S2a, normalizing the weights of the respective ones of the positive sample feature vectors and the weights of the respective ones of the negative sample feature vectors.

In an embodiment, in step S1, a k1-th one of the positive sample feature vectors has a corresponding one of the weights that were initialized:

$$WP_{k1} = \frac{1}{2 \times NP},$$

the k1-th one of the positive sample feature vectors has a corresponding one of the detection scores that were initialized: $HP_{k1}=0$, a k2-th one of the negative sample feature vectors has a corresponding one of the weights that were initialized:

$$WN_{k2} = \frac{1}{2 \times NN},$$

the k2-th one of the negative sample feature vectors has a corresponding one of the detection scores that were initialized: $HP_{k2}=0$, NP is quantity of the positive samples, and NN is quantity of the negative samples, $k1 \in [1, NP]$, $k2 \in [1, NN]$.

In an embodiment, step S4 may comprise:

S41, retrieving a node from the storage structure, and calculating a ratio RATIO of a sum of the weights of the positive sample feature vectors in the node to a total weight, and a node score SCORE, wherein $$RATIO = \frac{WPS}{WPS + WNS},$$

$$SCORE = \max\left(-p, \min\left(p, p \times \log\left(\frac{RATIO}{1 - RATIO}\right)\right)\right),$$

wherein WPS is the sum of the weights of the positive sample feature vectors in wherein WPS is the sum of the weights of the positive sample feature vectors in the node, WNS is a sum of the weights of the negative sample feature vectors in the node, and p is a constant greater than 0; and S42, determining whether the node satisfies condition a and condition b simultaneously, wherein condition a is DEPTH<MAXDEPTH, and condition b is TH≤RATIO≤1−TH, wherein DEPTH is a depth of the node, MAXDEPTH is a preset maximum depth of the node, and TH is a preset ratio threshold, wherein upon determination that the node satisfies condition a and condition b simultaneously in step S42, it is determined that the node is splittable, otherwise it is determined that the node is not splittable.

In an embodiment, step S5 may comprise:

S51a, randomly selecting NF feature attributes, setting corresponding feature thresholds, and classifying the positive sample feature vectors and the negative sample feature vectors of the node for each of the feature attributes and its corresponding feature threshold to obtain NF feature classification results each containing a left subset and a right subset, wherein the threshold corresponding to an i-th one of the feature attributes is $TH_i$, $i \in [1, NF]$, wherein upon performance of the classifying based on the i-th one of the feature attributes, the feature vector in the node for which the i-th one of the feature attributes has a feature value less than $TH_i$ is placed into the left subset, and the feature vector in the node for which the i-th one of the feature attributes has a feature value greater than or equal to $TH_i$ is placed into the right subset;

S52a, calculating respective classification scores SCORE_C of respective ones of the classification results:

$$SCORE\_C = |WLP - WLN - WRP + WRN|,$$

wherein WLP is a sum of the weights of the positive sample feature vectors in the left subset, WLN is a sum of the weights of the negative sample feature vectors in the left subset, WRP is a sum of the weights of the positive sample feature vectors in the right subset, and WRN is a sum of the weights of the negative sample feature vectors in the right subset; and S53a, selecting the feature attribute and the feature threshold that correspond to the classification result with a largest one of the classification scores, as the feature attribute and its corresponding feature threshold that are to be selected for splitting of the node.

In an embodiment, the acquiring the plurality of positive samples may further comprise:

acquiring a respective position parameter vector L=(dx, dy, dw, dh) of each positive sample of the plurality of positive samples, wherein $$dx = \frac{x' - x}{w}$$

is an abscissa change rate, $$dy = \frac{y' - y}{h}$$

is an ordinate change rate, $$dw = \frac{w'}{w}$$

is a width change rate, $$dh = \frac{h'}{h}$$

is a height change rate, x and y are abscissa and ordinate of a center point of the original box of the positive sample, respectively, and w and h are width and height of the original box of the positive sample, respectively, x' and y' are abscissa and ordinate of a center point of the perturbation box of the positive sample, respectively, and w' and h' are width and height of the perturbation box of the positive sample, respectively.

In an embodiment, step S5 may comprise:

S51b, randomly selecting NF feature attributes, setting corresponding feature thresholds, and classifying the node for each of the feature attributes and its corresponding feature threshold to obtain NF feature classification results each containing a left subset and a right subset, wherein the feature threshold corresponding to an i-th one of the feature attributes is $TH_i$, $i \in [1, NF]$, wherein upon performance of the classifying based on the i-th one of the feature attributes, the feature vector in the node for which the i-th one of the feature attributes has a feature value less than $TH_i$ is placed into the left subset, and the feature vector in the node for which the i-th one of the feature attributes has a feature value greater than or equal to $TH_i$ is placed into the right subset;

S52b, calculating respective classification scores SCORE_C of respective ones of the classification results:

SCORE_C=|WLP−WLN−WRP+WRN|, wherein WLP is a sum of the weights of the positive sample feature vectors in the left subset, WLN is a sum of the weights of the negative sample feature vectors in the left subset, WRP is a sum of the weights of the positive sample feature vectors in the right subset, and WRN is a sum of the weights of the negative sample feature vectors in the right subset;

S53b, determining positive and negative attributes of the left subset and the right subset in each of the classification results, wherein in case of positive WLP−WLN−WRP+WRN, the left subset has a positive attribute and the right subset has a negative attribute, otherwise the left subset has a negative attribute and the right subset has a positive attribute;

S54b, calculating a regression error ERROR_R of the positive sample feature vectors in the subset with the positive attribute:

$$ERROR\_R = Var(dx) + Var(dy) + Var(dw) + Var(dh),$$

wherein $$Var(dx) = \frac{1}{N} \sum (dx_j - \overline{dx})^2,$$

$$Var(dy) = \frac{1}{N} \sum (dy_j - \overline{dy})^2,$$

$$Var(dw) = \frac{1}{N} \sum (dw_j - \overline{dw})^2,$$

$$Var(dh) = \frac{1}{N} \sum (dh_j - \overline{dh})^2,$$

N is quantity of the positive sample feature vectors in the subset with the positive attribute, dxj, dyj, dwj, dhj are respectively the abscissa change rate, the ordinate change rate, the width change rate, and the height change rate in the position parameter vector of the positive sample corresponding to a j-th one of the positive sample feature vectors in the subset with the positive attribute, and $\overline{dx}, \overline{dy}, \overline{dw}, \overline{dh}$ are respectively an average value of the abscissa change rates, an average value of the ordinate change rates, an average value of the width change rates, and an average value of the height change rates in the position parameter vector of the positive sample corresponding to the N positive sample feature vectors in the subset with the positive attribute;

S55b, calculating respective total scores SCORE_TOTAL of respective ones of the classification results:

SCORE_TOTAL=SCORE_C−λ*ERROR_R, wherein λ is a constant greater than 0; and

S56b, selecting the feature attribute and the feature threshold that correspond to the classification result with a largest one of the total scores as the feature attribute and its corresponding feature threshold that are to be selected for splitting of the node.

In an embodiment, in step S9, the detection score of the positive sample feature vector that was updated is $HP_{k1}' = HP_{k1} + hp_{k1}$, the detection score of the negative sample feature vector that was updated is $HN_{k2}' = HN_{k2} + hn_{k2}$, the weight of the positive sample feature vector that was updated is $$WP_{k1}' = \frac{\exp(-HP_{k1}')/NP}{2},$$

the weight of the negative sample feature vector that was updated is $$WN_{k2}' = \frac{\exp(HN_{k2}')/NN}{2},$$

wherein NP is quantity of the positive samples, NN is quantity of the negative samples, $HP_{k1}$ is the detection score of a current k1-th one of the positive sample feature vectors, $HN_{k2}$ is the detection score of a current k2-th one of the negative sample feature vectors, $hp_{k1}$ is a node score output by the weak classifier for which the training is currently completed when a k1-th one of the positive samples is input to the weak classifier, and $hp_{k2}$ is a node score output by the weak classifier for which the training is currently completed when a k2-th one of the negative samples is input to the weak classifier.

In an embodiment, the feature extraction algorithm comprises at least one of a directional gradient histogram feature extraction algorithm, a luminance chrominance color feature extraction algorithm, or a local binary pattern feature extraction algorithm.

According to some embodiments of the present disclosure, a target detection method is provided. The target detection method may comprise: generating a target detection model using the generation method as described above; normalizing an image for detection, and performing feature vector extraction using a preset feature extraction algorithm to obtain a feature vector for detection; and classifying the feature vector for detection using the target detection model, and determining whether a target is contained in the image for detection based on a result of the classifying.

In an embodiment, the classifying the feature vector for detection using the target detection model may comprise: classifying the feature vector for detection using each weak classifier of the target detection model individually, and acquiring a score of a node in the weak classifier into which the feature vector for detection is classified; summing all node scores that were acquired to obtain a classifier total score S; determining whether the classifier total score S is larger than a preset threshold score S', wherein upon determination that S>S', it is detected that the target is contained in the image for detection, otherwise it is detected that the target is not contained in the image for detection.

In an embodiment, the classifying the feature vector for detection using the target detection model may comprise:

classifying the feature vector for detection using each weak classifier of the target detection model individually, and acquiring a score of a node in the weak classifier into which the feature vector for detection is classified;

determining, for each weak classifier, whether a leaf node in the weak classifier into which the feature vector for detection is classified has a positive attribute, wherein upon determination that the leaf node has the positive attribute, an average value of the abscissa change rates, an average value of the ordinate change rates, an average value of the width change rates, and an average value of the height change rates are acquired that correspond to the leaf node;

summing all node scores that were acquired to obtain a classifier total score S;

determining whether the classifier total score S is greater than a preset threshold score S', wherein upon determination that S>S', it is detected that the target is contained in the image for detection;

upon detection that the target is contained in the image for detection, calculating a position parameter vector of the image for detection according to the average value of the abscissa change rates, the average value of the ordinate change rates, the average value of the width change rates, and the average value of the height change rates that were acquired; and adjusting a detection box that frames the image for detection according to the position parameter vector of the image for detection.

In an embodiment, the position parameter vector corresponding to the target is $$L' = (dx', dy', dw', dh'),$$

wherein $$dx' = \frac{\sum_{k=1}^{T}(\overline{dx}(k) * \text{SCORE}(k) * M(k))}{\sum_{k=1}^{T}(\text{SCORE}(k) * M(k))},$$

$$dy' = \frac{\sum_{k=1}^{T}(\overline{dy}(k) * \text{SCORE}(k) * M(k))}{\sum_{k=1}^{T}(\text{SCORE}(k) * M(k))},$$

$$dw' = \frac{\sum_{k=1}^{T}(\overline{dw}(k) * \text{SCORE}(k) * M(k))}{\sum_{k=1}^{T}(\text{SCORE}(k) * M(k))},$$

$$dh' = \frac{\sum_{k=1}^{T}(\overline{dh}(k) * \text{SCORE}(k) * M(k))}{\sum_{k=1}^{T}(\text{SCORE}(k) * M(k))},$$

k denotes a serial number of the weak classifier, k being greater than or equal to 1 and less than T; M(k) denotes whether a leaf node in a k-th weak classifier into which the feature vector for detection is classified has a positive attribute, wherein in case of a positive attribute, M(k)=1, and in case of a negative attribute, M(k)=0; SCORE(k) is a node score of the leaf node in the k-th weak classifier into which the feature vector for detection is classified; $\overline{dx}(k)$, $\overline{dy}(k)$, $\overline{dw}(k)$, and $\overline{dh}(k)$ are respectively an average value of the abscissa change rates, an average value of the ordinate change rates, an average value of the width change rates, and an average value of the height change rates that correspond to the leaf node in the k-th weak classifier into which the feature vector for detection is classified, the detection box that was adjusted has an abscissa of X=x+w*dx', an ordinate of Y=y+h*dy', a width of W=w*dw', and a height of H=h*dh', wherein x, y are abscissa and ordinate of a center of the image for detection after the normalizing, respectively, w, h are width and height of the image for detection after the normalizing, respectively.

According to some embodiments of the present disclosure, a computing device is provided. The computing device may comprise: a processor; and a memory storing a computer program that, when executed by the processor, causes the processor to perform the sample detection method as described above, or the target detection model generation method as described above, or the target detection method as described above.

According to some embodiments of the present disclosure, a computer readable medium storing a computer program that, when executed by a processor, causes the processor to perform the sample detection method as described above, or the target detection model generation method as described above, or the target detection method as described above.

DETAILED DESCRIPTION

It is to be noted that, in order to facilitate the understanding of the present disclosure, the present disclosure is described by way of example where the target is a pedestrian. However, it will be understood by those skilled in the art that the target may be any other object according to the present disclosure, such as a cat, a dog, an elephant or the like. It should also be noted that, in the following, the sample acquisition method according to the present application is described only by taking a positive sample as an example, but those skilled in the art should understand that the sample acquisition method according to the present application can also be applied to the acquisition of other samples, for example, to the acquisition of negative samples.

In the related art, in an original image, only one positive sample can be extracted for one pedestrian, and thus the number of positive samples that can be extracted from the original image is limited. In addition, in the related art, it is difficult for the classifier trained based on the positive samples extracted by the positive sample identification box to recognize a pedestrian image containing a background, thereby resulting in low recognition accuracy.

In order to solve at least one of the technical problems existing in the related art, the present disclosure proposes a sample acquisition method, a pedestrian detection model generation method, a pedestrian detection method, a computing device, and a computer readable medium.

The sample acquisition method, the pedestrian detection model generation method, the pedestrian detection method, the computing device, and the computer readable medium provided by the present disclosure may effectively improve the recognition accuracy of the pedestrian detection model by increasing the number of extractable positive samples and adding a background to the positive samples. Furthermore, in the present disclosure, by acquiring a positional parameter vector of a pedestrian in the positive sample and by determining a feature attribute at the time of splitting based on a classification score and a positioning error in the process of training a weak classifier, the pedestrian detection model finally shaped may be enabled to not only detect whether there is a pedestrian in the image for detection but also determine a position of the pedestrian accurately when presence of the pedestrian is detected in the image for detection.

In order to enable those skilled in the art to better understand the technical solutions of the present disclosure, a sample acquisition method, a pedestrian detection model generation method, a pedestrian detection method, a computing device, and a computer readable storage medium provided by the present disclosure are described in detail below in connection with the accompanying drawings.

Figure 1:
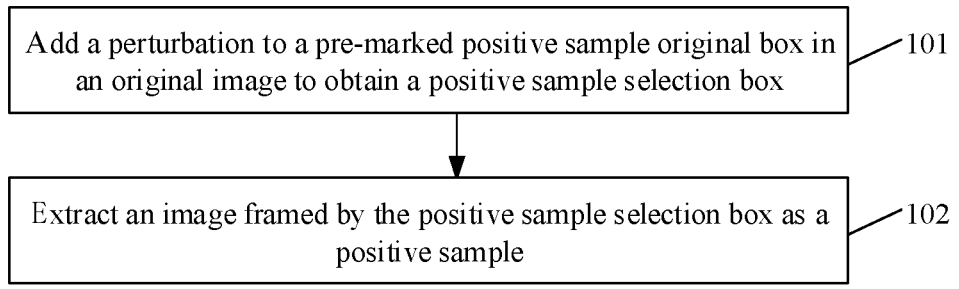
FIG. 1 is a flow chart of a method for acquiring a positive sample according to an embodiment of the present disclosure.

FIG. 1 is a flow chart of a positive sample acquisition method according to an embodiment of the present disclosure. As shown in FIG. 1, the positive sample acquisition method may include:

Step 101, adding a perturbation to a pre-marked positive sample original box in an original image to obtain a positive sample selection box.

The positive sample original box in the present disclosure is the positive sample identification box marked artificially in the related art, and the positive sample original box exactly frames a complete pedestrian. According to the present disclosure, a random perturbation is added to the positive sample original box such that the positive sample original box moves within a certain region to obtain a positive sample selection box.

Figure 2A:
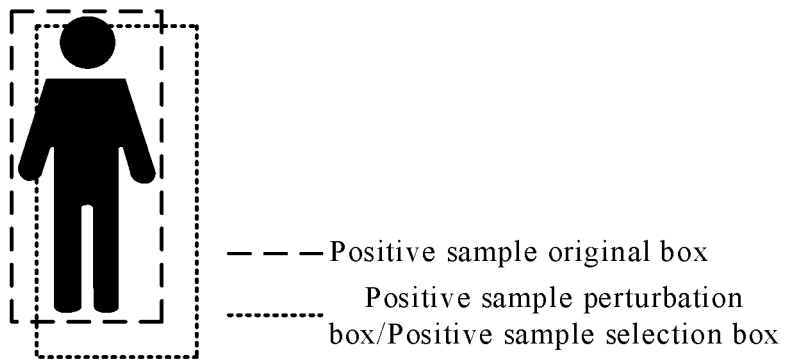
FIG. 2a is a schematic diagram of acquiring a positive sample selection box based on a positive sample original box according to an embodiment of the present disclosure.

FIG. 2a is a schematic diagram of acquiring a positive sample selection box based on a positive sample original box according to an embodiment of the present disclosure. As shown in FIG. 2a, as an alternative, in step 101, a random perturbation is added to a center position of the positive sample original box to obtain a positive sample perturbation box, and the positive sample perturbation box serves as a positive sample selection box. In this case, the positive sample selection box is exactly the same as the positive sample perturbation box in shape and size. Similar to the embodiment shown in FIG. 2a, in step 101, a perturbation can be added to the width of the positive sample original box or the high of the positive sample original box to obtain a positive sample perturbation box.

Figure 2B:
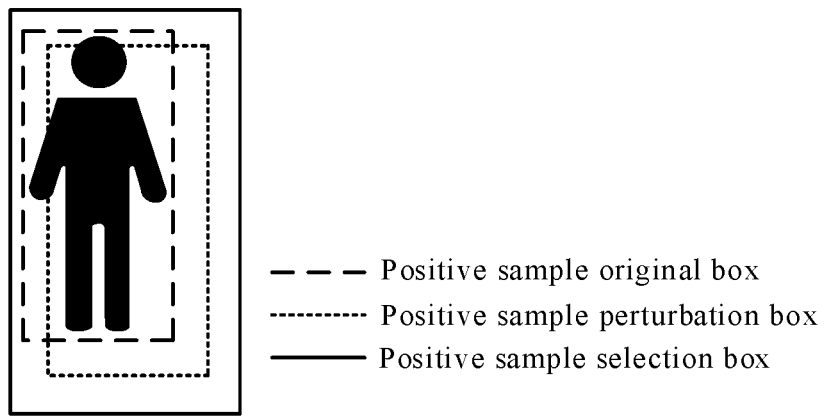
FIG. 2b is a schematic diagram of acquiring a positive sample selection box based on a positive sample original box according to another embodiment of the present disclosure.

FIG. 2b is a schematic diagram of acquiring a positive sample selection box based on a positive sample original box according to another embodiment of the present disclosure. As shown in FIG. 2b, unlike the process of acquiring the positive sample shown in FIG. 2a, in the acquisition process shown in FIG. 2b, after obtaining the positive sample perturbation box by adding a random perturbation to the center position of the positive sample original box, the center position of the positive sample perturbation box may be kept unchanged, and the positive sample perturbation box is randomly enlarged or reduced to obtain a positive sample selection box. By randomly enlarging or reducing the positive sample perturbation box to obtain the positive sample selection box, the robustness of a pedestrian detection model that is to be trained subsequently can be further improved. This way, by improving the diversity of the positive sample selection box, the detection algorithm can be provided with an improved anti-interference ability. In other words, the detector can still accurately detect the target even if there is such an error in the actual selection box that the target is not exactly framed.

In an example where the positive sample perturbation box is randomly enlarged a times, the center position of the positive sample perturbation box is kept unchanged, and the width and height of the positive sample perturbation box are simultaneously enlarged $\sqrt{a}$ times, thereby obtaining a positive sample selection box. In an embodiment, different perturbations can be added to the width and height of the positive sample perturbation box.

In practical applications, for the purpose of a guaranteed quality of the positive sample, the image framed by the positive sample selection box should contain at least part of an image of the pedestrian. In an embodiment, the image framed by the positive sample selection box may contain a complete image of the pedestrian.

In step 101, the background around the pedestrian can be acquired by adding a perturbation to the positive sample original box. In other words, the positive sample selection box contains not only the image of the pedestrian but also an image of the background around the pedestrian. This may greatly improve the robustness of the pedestrian detection model.

As shown in FIG. 1, the method may further include step 102 of extracting an image framed by the positive sample selection box as a positive sample.

In this embodiment, for one pedestrian in the original image, an infinite number of different positive sample perturbation boxes can be obtained by adding a random perturbation to the positive sample original box, and then corresponding positive sample selection boxes can be obtained by enlarging the positive sample perturbation boxes. The number of the positive sample selection boxes is theoretically infinite. Therefore, an infinite number of different positive samples can be extracted by the positive sample acquisition method according to the present disclosure.

The technical solution of the present disclosure can acquire a plurality of different positive samples from one pedestrian, thereby effectively increasing the number of positive samples that can be extracted in the original image, which facilitates improvement of the recognition accuracy of the classifier. In addition, the positive sample contains not only the complete image of the pedestrian but also the image of the background around the pedestrian, improving to some extent the recognition ability of the classifier to pedestrians.

Figure 3:
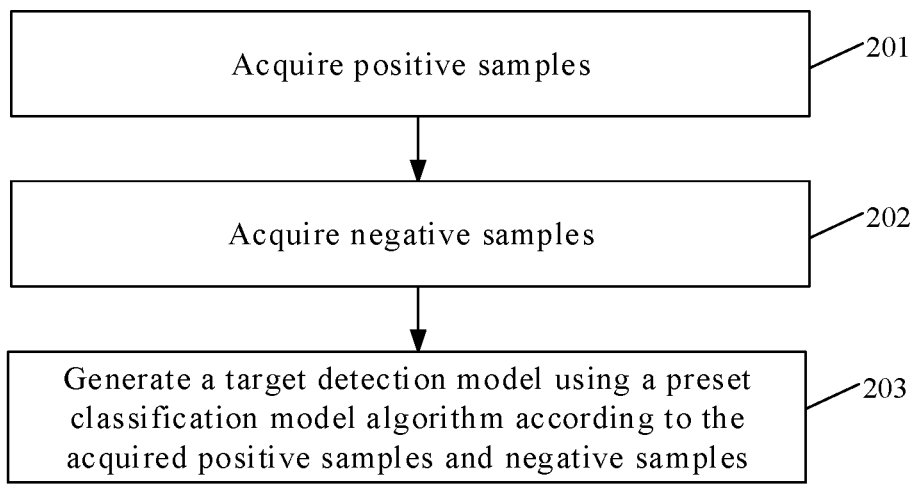
FIG. 3 is a flow chart of a method for generating a pedestrian detection model according to an embodiment of the present disclosure.

FIG. 3 is a flow chart of a method for generating a pedestrian detection model according to an embodiment of the present disclosure. As shown in FIG. 3, the pedestrian detection model generation method may include:

Step 201, acquiring a plurality of positive samples.

In step S201, the positive sample acquisition method provided in the foregoing embodiments is used to acquire a plurality of different positive samples, and the detailed process is not described here again. In this embodiment, the number of the positive samples may be NP.

The pedestrian detection model generation method may further include step 202 of extracting, from the original image, a plurality of images that do not contain a pedestrian as negative samples.

The plurality of images that do not contain the pedestrian are randomly selected from the original image, each of which can be used as a negative sample. The process of selecting the negative samples is the same as in the related art and will not be described in detail here. In this embodiment, the number of the negative samples may be NN.

It should be noted that in practical applications, the number NN of the negative samples is often greater than the number NP of the positive samples. For example, the number of the positive samples is 2,000, and the number of the negative samples is 20,000.

As shown in FIG. 3, the pedestrian detection model generation method may further include step S203 of generating a pedestrian detection model using a preset classification model algorithm according to the acquired plurality of positive samples and the plurality of negative samples.

Figure 4:
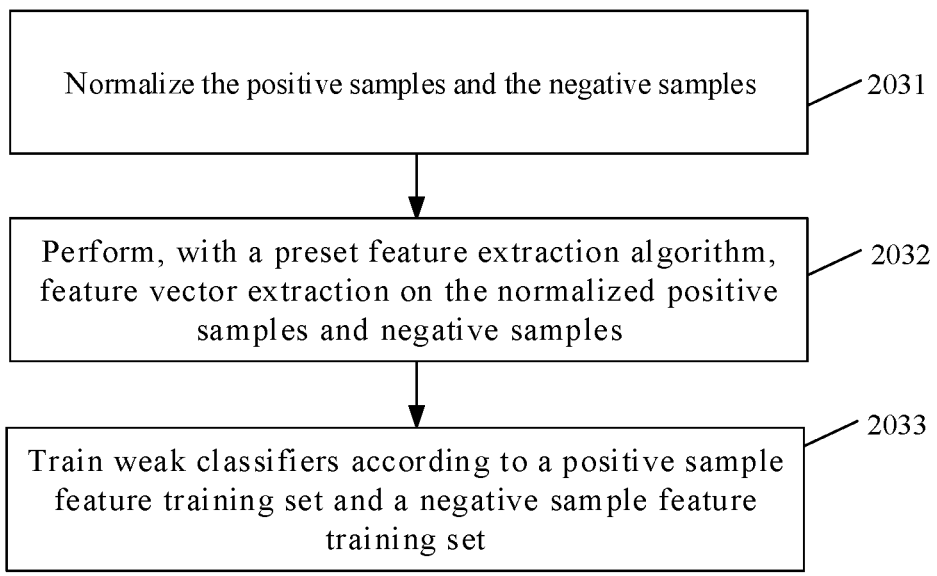
FIG. 4 is a flow chart of an embodiment of step 203 as shown in FIG. 3.

FIG. 4 is a flow chart of an embodiment of step 203 as shown in FIG. 3. As shown in FIG. 4, step 203 may include:

Step 2031, normalizing the positive samples and the negative samples.

First, the sample images X are scaled so as to be converted into standard images having a specific width W, a height H and feature color channels (e.g., RGB channels). The pixel data of the standard image is expressed as X(m, n, c), where m represents the ordinate on the image, with a value range of [1, H], n represents the abscissa, with a value range of [1, W], and c represents the RGB color channel, with a value range of 1, 2, and 3.

As shown in FIG. 4, step 203 may further include step 2032 of performing feature vector extraction on the normalized positive samples and negative samples using a preset feature extraction algorithm to obtain a positive sample feature training set and a negative sample feature training set.

For example, the normalized positive samples and negative samples are subjected to feature vector extraction using a preset feature extraction algorithm to obtain a positive sample feature training set FP and a negative sample feature training set FN, where FP={$FP_1, \ldots, FP_{k1}, \ldots, FP_{NP}$}, FN={$FN_1, \ldots, FN_{k2}, \ldots, FN_{NN}$}, $FP_{k1}$ represents the feature vector corresponding to the k1-th positive sample, k1∈[1, NP], $FN_{k2}$ represents the feature vector corresponding to the k2-th negative sample, k2∈[1, NN].

In an embodiment, the preset feature extraction algorithm may include at least one of a histogram of oriented gradient (HOG) feature extraction algorithm, a luminance chrominance (LUV) color feature extraction algorithm, or a local binary pattern (LBP) feature extraction algorithm. In an embodiment, the preset classification model algorithm as previously described may include the above preset feature extraction algorithm.

As shown in FIG. 4, step 203 may further include step 2033 of training a plurality of weak classifiers based on the positive sample feature training set and the negative sample feature training set. All of the weak classifiers form a pedestrian detection model. In an embodiment, an Adaboost algorithm is employed to generate the plurality of weak classifiers, and in turn, a strong classifier is formed based on the plurality of weak classifiers.

Figure 5:
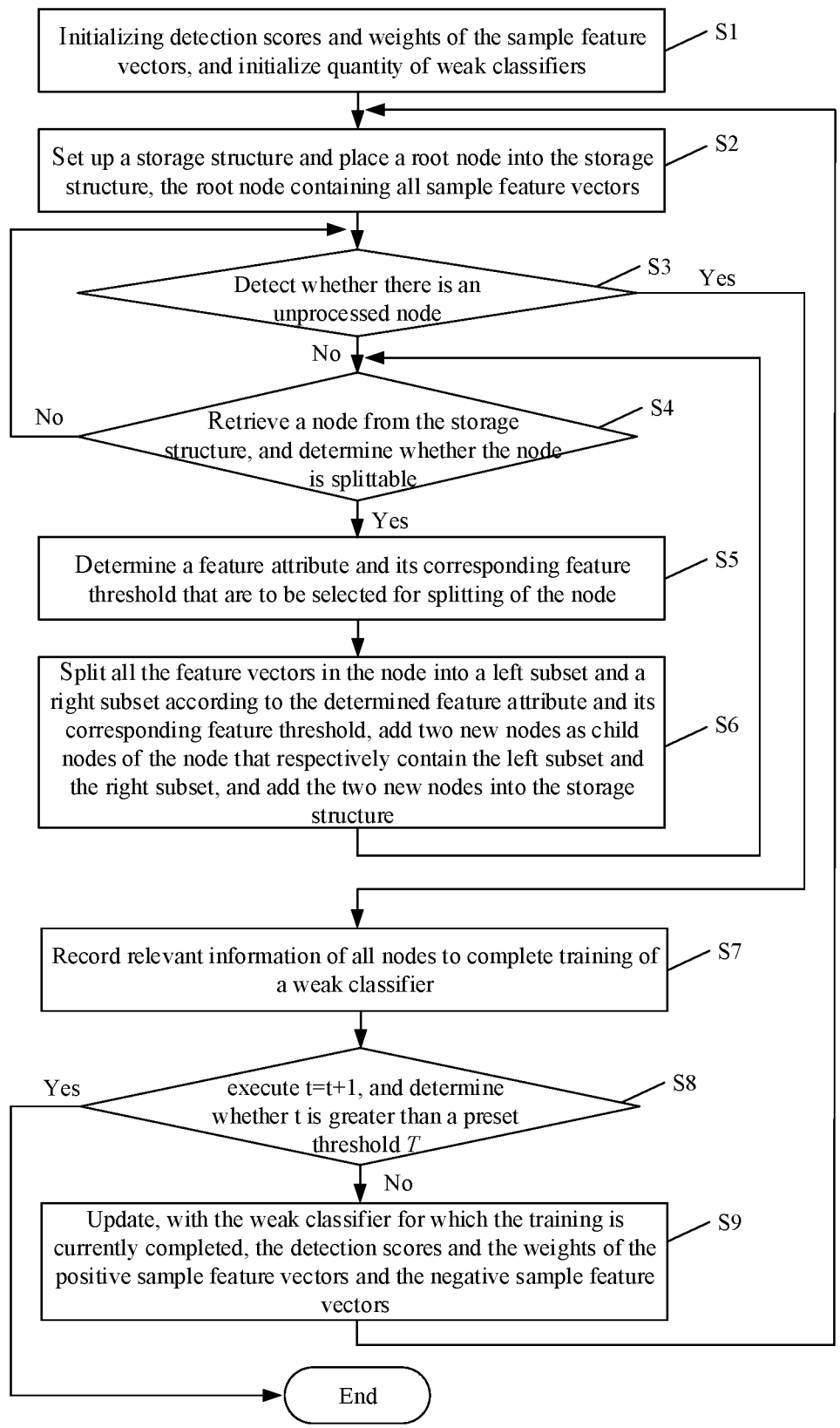
FIG. 5 is a flow chart of an embodiment of step 2033 as shown in FIG. 4.

FIG. 5 is a flow chart of an embodiment of step 2033 as shown in FIG. 4. As shown in FIG. 5, step 2033 may include:

Step S1, initializing detection scores and weights of the sample feature vectors, and initializing the number of the weak classifiers.

For example, the detection scores and weights corresponding to the positive sample feature vectors in the positive sample feature training set FP are initialized, wherein the initialized weight of the k1-th positive sample feature vector may be $$WP_{k1} = \frac{1}{2 \times NP},$$

and the initialized detection score of the k1-th positive sample feature vector may be $HP_{k1}=0$.

The detection scores and weights corresponding to the negative sample feature vectors in the negative sample feature training set FN are initialized, wherein the initialized weight of the k2-th negative sample feature vector may be $$WN_{k2} = \frac{1}{2 \times NN},$$

and the initialized detection score of the k2-th negative sample feature vector may be $HN_{k2}=0$.

The number of the weak classifiers is initialized as t=0, indicating that the number t of currently obtained weak classifiers is zero.

As shown in FIG. 5, step 2033 may further include step S2 of setting up an empty storage structure and placing a root node into the storage structure, with the depth of the root node being 1, and the root node containing all of the positive sample feature vectors and all of the negative sample feature vectors.

In this embodiment, the storage structure is described by taking a first in first out (FIFO) stack as an example. Of course, the storage structure can also be other storage structures with a data storage function.

In step S2, an empty FIFO node stack is created, and the root node is placed into the stack, with the depth of the root node being set to 1, and the root node containing all of the NP positive sample feature vectors $FP_{k1}$ and all of the NN negatives sample feature vectors $FN_{k2}$, k1∈[1, NP], k2∈[1, NN].

It should be noted that, in order to facilitate subsequent calculations, step S2a may be further included between step S1 and step S3 to normalize the weights of the sample feature vectors.

In an embodiment, the sum of the weights (a total weight) of all positive sample feature vectors and all negative sample feature vectors can be calculated as $$W = \sum_{k1=1}^{NP} WP_{k1} + \sum_{k2=1}^{NN} WN_{k2},$$

and the weight of each positive sample feature vector and the weight of each negative sample feature vector are divided by W to normalize the weights, such that the sum of the normalized weights of all the positive and negative sample feature vectors is 1.

It should be noted that step S2a may be performed before or after step S2, or simultaneously with step S2.

As shown in FIG. 5, step 2033 may further include step S3 of detecting whether there is an unprocessed node in the storage structure.

In step S3, if it is detected that there is no unprocessed node in the storage structure, step S7 is performed. If it is detected that there is an unprocessed node in the storage structure, step S4 is performed. In an embodiment, whether a node has been processed may be indicated by setting an identifier. For example, if the identifier has a value of 1, it indicates that the node has been processed. If the identifier has a value of 0, it indicates that the node has not been processed.

As shown in FIG. 5, step 2033 may further include step S4 of retrieving an unprocessed node from the storage structure and determining whether the node is splittable.

Figure 6:
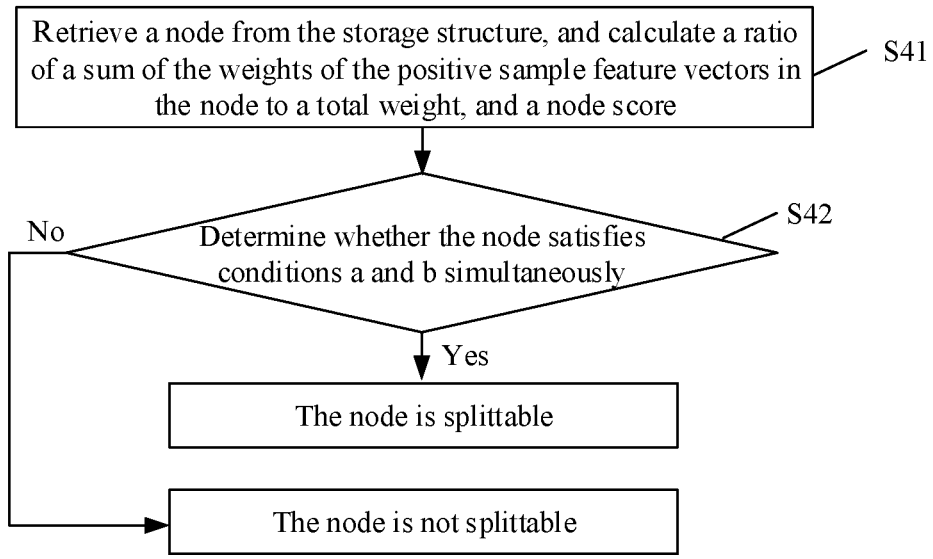
FIG. 6 is a flow chart of an embodiment of step S4 as shown in FIG. 5.

FIG. 6 is a flow chart of an embodiment of step S4 as shown in FIG. 5. As shown in FIG. 6, step S4 may include:

Step S41, retrieving an unprocessed node from the storage structure, and calculating a ratio RATIO of a sum of weights of the positive sample feature vectors in the node to the total weight, and a score SCORE of the node.

It is assumed that the depth of the retrieved node is DEPTH, the node contains NP2 positive sample feature vectors $FP_{k3}$ and NN2 negative sample feature vectors $FP_{k4}$, where k3∈[1, NP2], k4∈[1, NN2]. In the case where the node is the root node, NP2 may be equal to NP and NN2 may be equal to NN. In addition, the ratio of the sum of the weights of the positive sample feature vectors in the node to the total weight and the node score are:

$$RATIO = \frac{WPS}{WPS + WNS},$$

$$SCORE = \max\left(-p, \min\left(p, p \times \log\left(\frac{RATIO}{1-RATIO}\right)\right)\right),$$

where $WPS = \sum_{k3=1}^{NP2} WP_{k3}, WNS = \sum_{k4=1}^{NN2} WN_{k4}.$

WPS is the sum of the weights of the positive sample feature vectors in the node, WNS is the sum of the weights of the negative sample feature vectors in the node, and p is a constant greater than 0 (e.g., p=5).

As shown in FIG. 6, step S4 may further include:

Step S42, determining whether the node satisfies condition a and condition b at the same time.

In an embodiment, condition a can be:

DEPTH<MAXDEPTH, and condition b can be:

$TH \leq RATIO \leq 1-TH$, where MAXDEPTH is a preset maximum depth of the node (e.g., MAXDEPTH=5), and TH is a preset ratio threshold (e.g., TH=0.001).

If it is determined in step S42 that the node satisfies condition a and condition b at the same time, it is determined that the node is splittable. If it is determined in step S42 that the node cannot satisfy condition a and condition b at the same time, it is determined that the node is not splittable.

If it is determined in step S4 that the node is splittable, step S5 is performed. If it is determined in step S4 that the node is not splittable, step S3 is performed.

Step S5, determining a feature attribute and its corresponding feature threshold that are to be selected for splitting of the node.

Figure 7A:
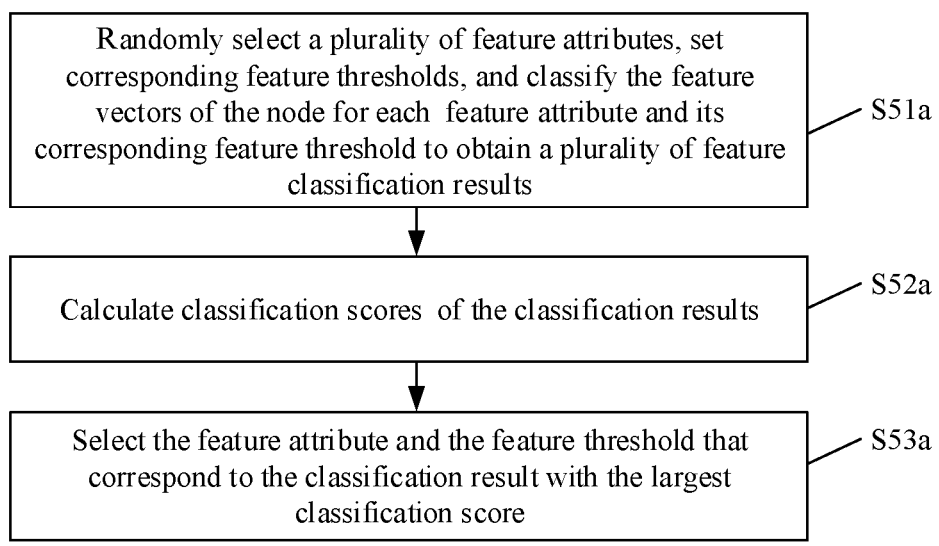
FIG. 7a is a flow chart of an embodiment of step S5 as shown in FIG. 5.

As an alternative to the present disclosure, in step S5, the feature attribute and the feature threshold at the time of splitting are determined based only on a classification score (a classification error). FIG. 7a is a flow chart of an embodiment of step S5 as shown in FIG. 5. As shown in FIG. 7a, step S5 may include:

Step S51a, randomly selecting a plurality of feature attributes, setting corresponding feature thresholds, and classifying all of the feature vectors (including the positive sample feature vectors and the negative sample feature vectors) of the node for each feature attribute and its corresponding feature threshold to obtain a plurality of feature vector classification results.

For example, in step S51a, NF (e.g., 1000) feature attributes are randomly selected, and corresponding feature threshold values are set. The feature vectors in the node are classified for each feature attribute and its corresponding feature threshold to obtain NF features classification results, each classification result containing a left subset and a right subset. Assuming that the threshold corresponding to the i-th feature attribute is $TH_i$, i∈[1, NF], then in performing the classification based on the i-th feature attribute, a feature vector in the node for which the i-th feature attribute has a feature value smaller than $TH_i$ may be placed into the left subset, and a feature vector in the node for which the i-th feature attribute has a feature value greater than or equal to $TH_i$ may be placed into the right subset.

As shown in FIG. 7a, step S5 may further include step S52a of calculating a respective classification score SCORE_C of each of the classification results of the node.

The classification score is SCORE_C=|WLP−WLN−WRP+WRN|, where WLP is the sum of the weights of the positive sample feature vectors in the left subset, WLN is the sum of the weights of the negative sample feature vectors in the left subset, WRP is the sum of the weights of the positive sample feature vectors in the right subset, and WRN is the sum of the weights of the negative sample feature vectors in the right subset.

As shown in FIG. 7a, step S5 may further include step S53a of selecting a feature attribute and a feature threshold that correspond to the classification result with the largest classification score.

In step S53a, the classification scores of the classification results are compared and ranked, and the feature attribute and feature threshold of the classification result with the largest classification score are selected as the feature attribute and its corresponding feature threshold that are to be selected for splitting of the node.

Figure 7B:
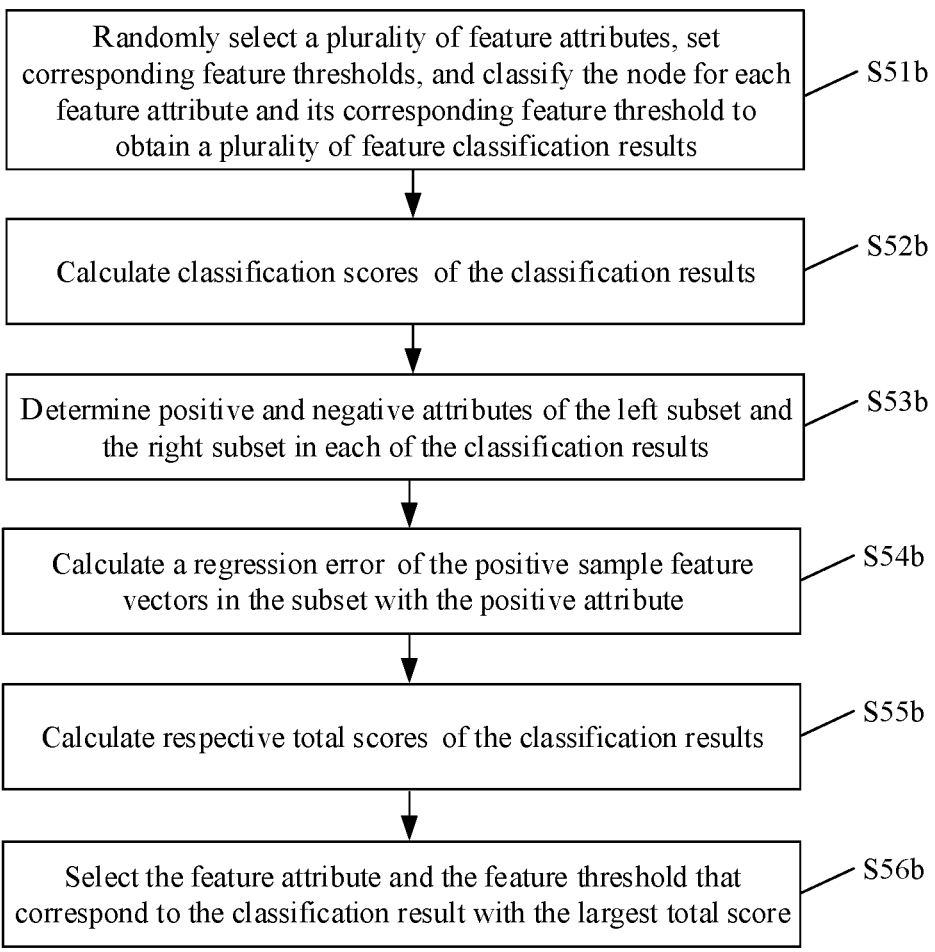
FIG. 7b is a flow chart of another embodiment of step S5 as shown in FIG. 5.

FIG. 7b shows a flow chart of another embodiment of step S5 as shown in FIG. 5. In this embodiment, the feature attribute and the feature threshold at the time of splitting can be determined based on a classification score (a classification error) and a positioning error (a position variance).

In this case, while acquiring the positive samples by step 201, it is also necessary to acquire respective position parameter vectors L=(dx, dy, dw, dh) of the positive samples, wherein $$dx = \frac{x' - x}{w}$$

is an abscissa change rate, $$dy = \frac{y' - y}{h}$$

is an ordinate change rate, $$dw = \frac{w'}{w}$$

is a width change rate, and $$dh = \frac{h'}{h}$$

is a height change rate.

x and y are abscissa and ordinate of a center point of the original box of the positive sample, respectively, w and h are width and height of the original box of the positive sample, respectively, x' and y' are abscissa and ordinate of a center point of the positive sample perturbation box, respectively, and w' and h' are width and height of the positive sample perturbation box, respectively.

As shown in FIG. 7b, step S5 may include:

Step S51b, randomly selecting a plurality of (e.g., NF) feature attributes, setting corresponding feature thresholds, and classifying the feature vectors in the node for each feature attribute and its corresponding feature threshold to obtain a plurality of (e.g., NF) corresponding feature classification results.

Step S5 may further include step S52b of calculating a classification score SCORE_C of each classification result.

For details of steps S51b and S52b, reference can be made to the foregoing description of steps S51a and S52a, and the details are not described herein again.

Step S5 may further include step S53b of determining positive and negative attributes of the left subset and the right subset in each classification result.

In step S53b, it is determined whether the value of WLP−WLN−WRP+WRN is positive or negative. If WLP−WLN−WRP+WRN; has a positive value, the left subset has a positive attribute and the right subset has a negative attribute. If WLP−WLN−WRP+WRN has a negative value, the left subset has a negative attribute and the right subset has a positive attribute.

Step S5 may further include step S54b of calculating for each classification result a regression error ERROR_R of the positive sample feature vectors in the subset with a positive attribute in the classification result.

The regression error is $$ERROR\_R = Var(dx) + Var(dy) + Var(dw) + Var(dh),$$

where $Var(dx) = \frac{1}{N}\Sigma(dx_j - \overline{dx})^2$, $Var(dy) = \frac{1}{N}\Sigma(dy_j - \overline{dy})^2$, $Var(dw) = \frac{1}{N}\Sigma(dw_j - \overline{dw})^2$, $Var(dh) = \frac{1}{N}\Sigma(dh_j - \overline{dh})^2$, N is the number of the positive sample feature vectors in the subset with the positive attribute, dxj, dyj, dwj, dhj are respectively the abscissa change rate, the ordinate change rate, the width change rate, and the height change rate in the position parameter vector of the positive sample corresponding to the j-th positive sample feature vector in the subset, and $\overline{dx}, \overline{dy}, \overline{dw}, \overline{dh}$, are respectively an average value of the abscissa change rates (that is, the result of adding N abscissa change rates and then averaging), an average value of the ordinate change rates (that is, the result of adding N ordinate change rates and then averaging), an average value of the width change rates (that is, the result of adding N width change rates and then averaging), and an average value of the height change rates (that is, the result of adding N height change rates and then averaging) in the position parameter vector of the positive sample corresponding to the N positive sample feature vectors in the subset.

Step S5 may further include step S55b of calculating respective total scores SCORE_TOTAL of the classification results.

In an embodiment, the total score can be SCORE_TOTAL=SCORE_C−λ*ERROR_R, where λ is a constant greater than 0 (e.g., λ=0.1), which can be selected based on actual experience.

Step S5 may further include step S56b of selecting the feature attribute and the feature threshold that correspond to the classification result with the largest total score.

In step S56b, the total scores of the classification results are compared and ranked, and the feature attribute and feature threshold of the classification result with the largest total score are selected as the feature attribute and its corresponding feature threshold that are to be selected for splitting of the node.

Different from the feature attribute selected for splitting the node shown in FIG. 7a, the selection method shown in FIG. 7b considers not only the classification score but also the positioning error. This may not only improve the recognition accuracy of the classifier, but also accurately position the pedestrians in the image for detection to a certain extent. The principle of the positioning can be seen in the subsequent description.

Returning to FIG. 5, step 2033 may further include step S6 of splitting all feature vectors in the node into a left subset and a right subset according to the determined feature attribute and its corresponding feature threshold, adding two new nodes that respectively contain the left subset and the right subset as child nodes of the current node, and adding the two new nodes to the storage structure. The attributes of the two new nodes are the attributes of the left and right subsets. If the depth of the current node is DEPTH, the depth of the two new nodes is DEPTH+1. In an embodiment, where both the classification score and the positioning error are considered, the positive and negative attributes of the left subset and the right subset corresponding to the determined feature attribute and its corresponding feature threshold may be determined as previously described, and the average value of the abscissa change rates, the average value of the ordinate change rates, the average value of the width change rates, and the average value of the height change rates in the position parameter vector of the positive sample corresponding to the positive sample feature vector in the left or right subset with a positive attribute are determined as position-related average values of the node corresponding to the subset.

After the execution of step S6, step 2033 jumps to step S4.

As shown in FIG. 5, step 2033 may further include step S7 of recording relevant information of all nodes, such as node depth, child nodes, feature attributes and their corresponding feature thresholds, positive and negative attributes, for example, position-related average values (that is, the average of the abscissa change rates, the average of the ordinate change rates, the average of the width change rates, and the average of the height change rates) of the positive nodes, the total scores, and the like, thereby completing the training of a weak classifier.

When it is determined in step S3 that no child nodes in the storage structure are not processed, it indicates that no nodes can be split, and a decision tree corresponding to one classifier is completed. By recording the depth, child nodes, feature attributes, feature thresholds corresponding to the feature attributes of all nodes of the decision tree, the training of the weak classifier is completed.

In an embodiment, step 2033 may further include step S8 of executing t=t+1 and determining whether t is greater than a preset threshold T.

t is the current number of the weak classifiers, and the preset threshold T represents the upper limit of the number of the weak classifiers (for example, T=2000). If it is determined that t is greater than T, it means that the number of the weak classifiers reaches the upper limit, and the step of training the weak classifiers ends. Otherwise, step S9 is performed.

Step S9 includes updating the detection scores and weights of the positive sample feature vectors and the negative sample feature vectors using a weak classifier for which the training is currently completed.

In an embodiment, the detection score of the updated positive sample feature vector may be $HP_{k1}'=HP_{k1}+hp_{k1}$, the detection score of the updated negative sample feature vector may be $HP_{k2}'=HN_{k2}+hp_{k2}$, the weight of the updated positive sample feature vector may be $$WP_{k1}' = \frac{\exp(-HP_{k1}')/NP}{2},$$

and the weight of the updated negative sample feature vector may be $$WN_{k2}' = \frac{\exp(HN_{k2}')/NN}{2}.$$

NP is the number of the positive samples, NN is the number of the negative samples, $HP_{k1}$ is the detection score of the current k1-th positive sample feature vector, k1 being greater than or equal to 1 and less than NP, $HN_{k2}$ is the detection score of the current k2-th negative sample feature vector, k2 being greater than or equal to 1 and less than NN, $hp_{k1}$ is the node score output by the weak classifier for which the training is currently completed when the k1-th positive sample is input to the weak classifier, and $hp_{k2}$ is the node score output by the weak classifier for which the training is currently completed when the k2-th negative sample is input to the weak classifier.

After the detection scores and weights of the positive sample feature vectors are updated, for the same positive sample set and the same negative sample set initially provided, new weak classifiers can be continued to be trained using the updated detection scores and weights. Thus, step 2033 may jump to step S2. In general, for the Adboost algorithm, multiple (T) weak classifiers need to be trained for the same sample set (i.e., the NP positive samples and NN negative samples as described above), and then the multiple weak classifiers can be combined to form a strong classifier.

Embodiments of the present disclosure provide a pedestrian detection model generation method, and the pedestrian detection model generated based on the generation method may accurately identify pedestrians in the image for detection. In addition, when the position parameter vector is acquired while acquiring the positive sample, the finally generated pedestrian detection model may not only recognize the pedestrian in the image for detection, but also determine the position of the pedestrian in the image for detection.

Figure 8:
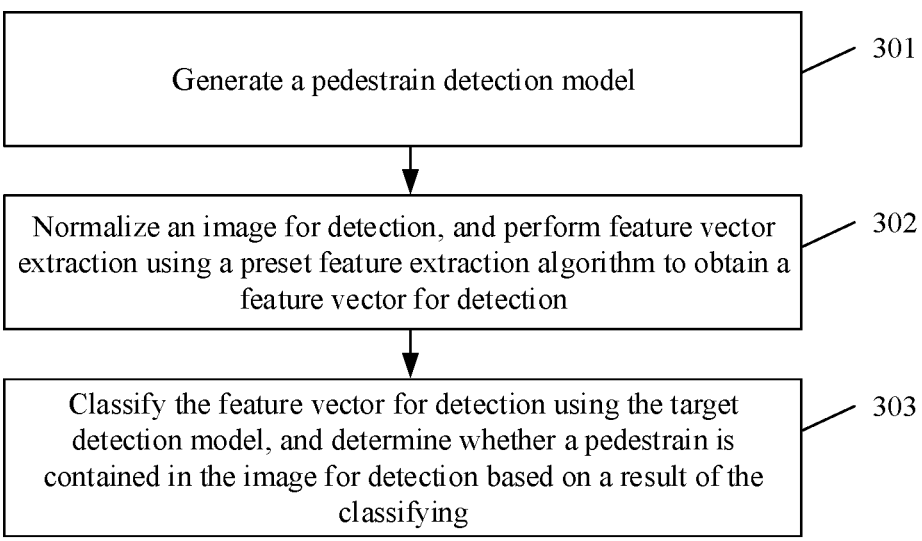
FIG. 8 is a flow chart of a method for detecting a pedestrian according to an embodiment of the present disclosure.

FIG. 8 is a flow chart of a pedestrian detection method according to an embodiment of the present disclosure. As shown in FIG. 8, the pedestrian detection method may include:

Step 301, generating a pedestrian detection model.

In step 301, the pedestrian detection model generation method is used to generate the pedestrian detection model. For the specific process, reference is made to the foregoing embodiments, the details of which are not described herein again.

The pedestrian detection method may further include step 302 of normalizing the image for detection, and performing feature vector extraction using a preset feature extraction algorithm to obtain a feature vector for detection.

According to the present disclosure, the image for detection may be obtained from a larger image using an original detection box formed by a preset rule. The image for detection is exactly a portion of the larger image that is framed by the original detection box. The coordinates of the center of the image for detection or the original detection box may be the coordinates with reference to the larger image. In an embodiment, a plurality of images for detection may be acquired from the larger image by sliding the original detection box.

According to the present disclosure, the image for detection can be normalized. Normalizing the image for detection may include converting the image for detection into a normalized image having a specific width w, a height h, and a feature color channel (in this case, the abscissa of the center of the standard image may be x, the ordinate may be y, the width of the normalized image is w, and the height is h), and the feature extraction algorithm used by the weak classifiers in the pedestrian detection model is used to perform feature vector extraction on the image for detection to obtain the feature vector for detection.

Step 303: classifying the feature vector for detection using a pedestrian detection model, and determining whether a pedestrian is contained in the image for detection based on the classification result.

Figure 9:
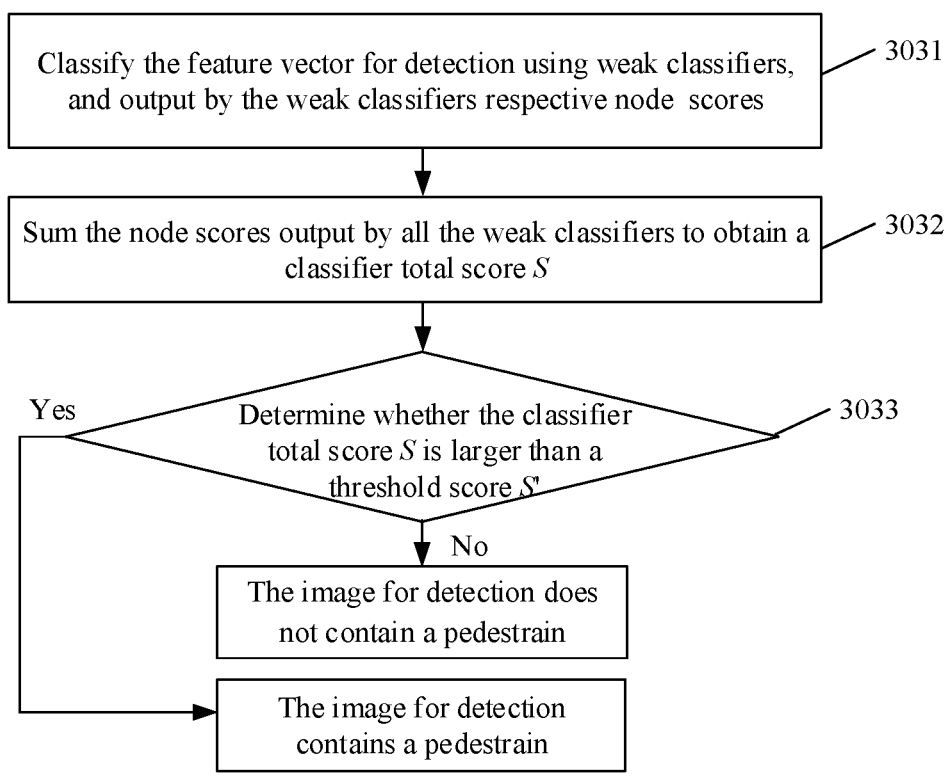
FIG. 9 is a flow chart of an embodiment of step 303 as shown in FIG. 8.

FIG. 9 is a flow chart of an embodiment of step 303 as shown in FIG. 8. As previously mentioned, the pedestrian detection model according to the present disclosure may include a plurality of weak classifiers. In this case, as shown in FIG. 9, step 303 may include:

Step 3031, classifying the feature vector for detection using each of the plurality of weak classifiers individually, and outputting corresponding node scores, wherein the node score output by the k-th classifier is denoted as $S_k$, $k \in [1, T]$, and T is the number of the weak classifiers. It should be noted that, for the k-th classifier for example, the feature vector for detection will be finally classified into a specific leaf node (i.e., a node having no child nodes) of the decision tree corresponding to the k-th classifier. Thus, for this feature vector for detection, the node score output by the k-th weak classifier is actually the node score of the specific leaf node recorded when the k-th weak classifier was trained, that is, calculated according to $$\text{SCORE} = \max\left(-p, \min\left(p, p \times \log\left(\frac{\text{RATIO}}{1 - \text{RATIO}}\right)\right)\right).$$

As shown in FIG. 9, step 303 may further include step 3032 of summing the node scores output by all the weak classifiers to obtain a classifier total score S, that is, $$S = \sum_{k=1}^{T} S_k.$$

Step 303 may further include a step 3033 of determining whether the classifier total score S is greater than a preset threshold score S'.

In step S3033, if it is determined that S>S', it is determined that the image for detection contains a pedestrian. Otherwise, it is determined that the image for detection does not contain a pedestrian.

The pedestrian detection method provided by the embodiment of the present disclosure can accurately detect whether a pedestrian is contained in the image for detection.

Figure 10:
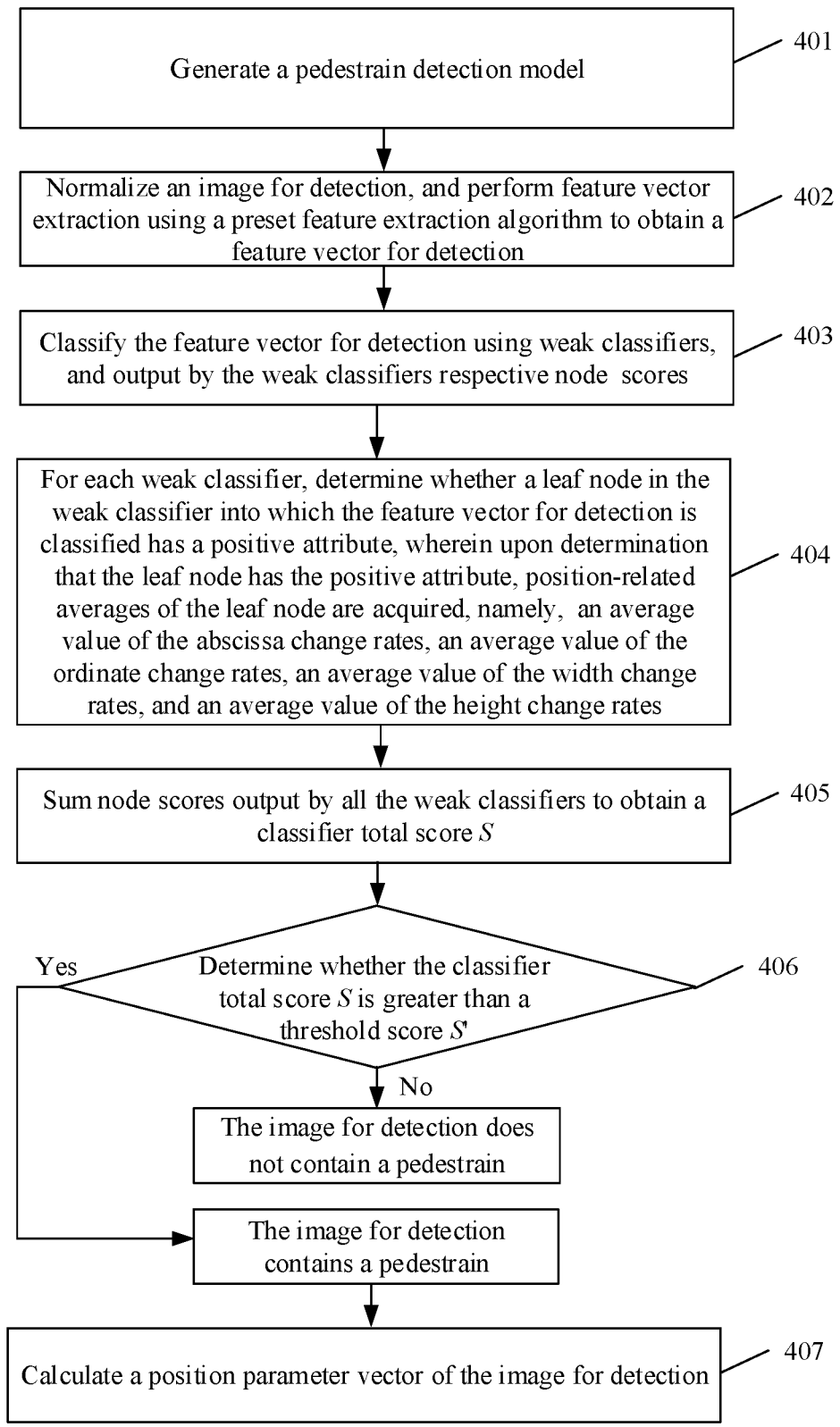
FIG. 10 is a flow chart of a method for detecting a pedestrian according to another embodiment of the present disclosure.

FIG. 10 is a flow chart of a pedestrian detection method according to another embodiment of the present disclosure. As shown in FIG. 10, the pedestrian detection method may include:

Step 401, generating a pedestrian detection model.

In the process of generating the weak classifiers in the pedestrian detection model, the feature attributes used in splitting the node are determined based on the classification score and the positioning error (such as in the method shown in FIG. 7b).

The pedestrian detection method may further include step 402 of normalizing the image for detection, and performing feature vector extraction using a preset feature extraction algorithm to obtain a feature vector for detection.

The abscissa of the center point of the image for detection may be represented as x, and the ordinate may be represented as y. In an embodiment, normalizing the image for detection may include converting the image for detection into a normalized image having a specific width w, a height h, and a feature color channel, and performing feature vector extraction on the detected image using the feature extraction algorithm assumed by the weak classifier in the pedestrian detection model, thereby obtaining a feature vector for detection.

As shown in FIG. 10, the pedestrian detection method proceeds to step 403 where each of the plurality of weak classifiers in the pedestrian detection model is used individually to classify the feature vector for detection, and corresponding node scores are output. The specific method is as shown in, for example, step 3031, the details of which are not described herein again.

The pedestrian detection method proceeds to step 404 where, for each weak classifier of the plurality of weak classifiers in the pedestrian detection model, it is determined whether the attribute of the leaf node in the weak classifier into which the to-be-detected feature vector is classified is positive, and when it is determined that the attribute of the leaf node of the weak classifier is positive, position-related average values (that is, the average value of the abscissa change rates, the average value of the ordinate change rates, the average value of the width change rates, and the average value of the height change rates) are acquired that correspond to the leaf node and recorded in the weak classifier in the pedestrian detection model.

For example, if it is determined that the attribute of the leaf node of the k-th weak classifier is positive, the corresponding position-related average values are acquired that are recorded in the weak classifier in the pedestrian detection model and correspond to the leaf node into which the feature vector for detection is classified, that is, the average value of the abscissa change rates $\overline{dx}(k)$, the average value of the ordinate change rates $\overline{dy}(k)$, the average value of the width change rates $\overline{dw}(k)$, and the average value of the height change rates $\overline{dh}(k)$.

The pedestrian detection method proceeds to step 405 where the node scores output by all the weak classifiers are summed to obtain a classifier total score S, that is, a total score $$S = \sum_{k=1}^{T} S_k.$$

The specific method is shown in step 3032 as described above.

The pedestrian detection method proceeds to step 406 where it is determined if the classifier total score S is greater than a preset threshold score S'.

In step 406, if it is determined that S>S', it is detected that the image for detection contains a pedestrian, in which case step 407 is performed. Otherwise, it is detected that the image for detection does not contain a pedestrian, and the flow ends.

In step 407, a position parameter vector L=(dx', dy', dw', dh') corresponding to the pedestrian in the image for detection is calculated according to the acquired position-related average values, wherein $$dx' = \frac{\sum_{k=1}^{T} (\overline{dx}(k) * \text{SCORE}(k) * M(k))}{\sum_{k=1}^{T} (\text{SCORE}(k) * M(k))},$$

-continued $$dy' = \frac{\sum_{k=1}^{T}(\overline{dy}(k)*\text{SCORE}(k)*M(k))}{\sum_{k=1}^{T}(\text{SCORE}(k)*M(k))},$$

$$dw' = \frac{\sum_{k=1}^{T}(\overline{dw}(k)*\text{SCORE}(k)*M(k))}{\sum_{k=1}^{T}(\text{SCORE}(k)*M(k))},$$

$$dh' = \frac{\sum_{k=1}^{T}(\overline{dh}(k)*\text{SCORE}(k)*M(k))}{\sum_{k=1}^{T}(\text{SCORE}(k)*M(k))}.$$

k denotes a serial number of the weak classifier, k being greater than or equal to 1 and less than T. M(k) denotes the attribute of the leaf node into which the feature vector for detection is classified in the k-th weak classifier. If the attribute is positive, M(k)=1, and if the attribute is negative, then M(k)=0. SCORE(k) is the node score of the leaf node into which the feature vector for detection is classified in the k-th weak classifier. $\overline{dx}(k)$, $\overline{dy}(k)$, $\overline{dw}(k)$, and $\overline{dh}(k)$ are respectively the position-related average values recorded in the k-th weak classifier and corresponding to the leaf node into which the feature vector for detection is classified, namely, the average value of the abscissa change rates, the average value of the ordinate change rates, the average value of the width change rates, and the average value of the height change rates.

The position parameter vector L'=(dx', dy', dw', dh') of the identification box calculated by the above step 407 can reflect the position information of the pedestrian in the image for detection to some extent and can be used to adjust the detection box that frames the image for detection. As described above, the center of the image for detection after normalization has an abscissa of x and an ordinate of y, and the normalized image for detection has a width w and a height h. According to the present disclosure, the detection box that frames the image for detection can be adjusted according to the position parameter vector L'=(dx', dy', dw', dh') calculated in step 407. In an embodiment, the adjusted abscissa of the detection box may be X=x+w*dx', the ordinate may be Y=y+h*dy', the width may be W=w*dw', and the height may be H=h*dh'. It should be noted that the adjusted detection box obtained at this point corresponds to the normalized image for detection. Therefore, in order to obtain an adjusted detection box corresponding to a larger image from which the image for detection is acquired, the adjusted detection box corresponding to the normalized image for detection may be processed in accordance with a process opposite to the normalization. The adjusted detection box will frame the pedestrian more accurately.

It can be seen that the pedestrian detection method provided by the embodiments of the present disclosure can not only detect whether there is a pedestrian in the image for detection, but also more accurately locate the position of the pedestrian when detecting the presence of a pedestrian in the image for detection.

Figure 11:
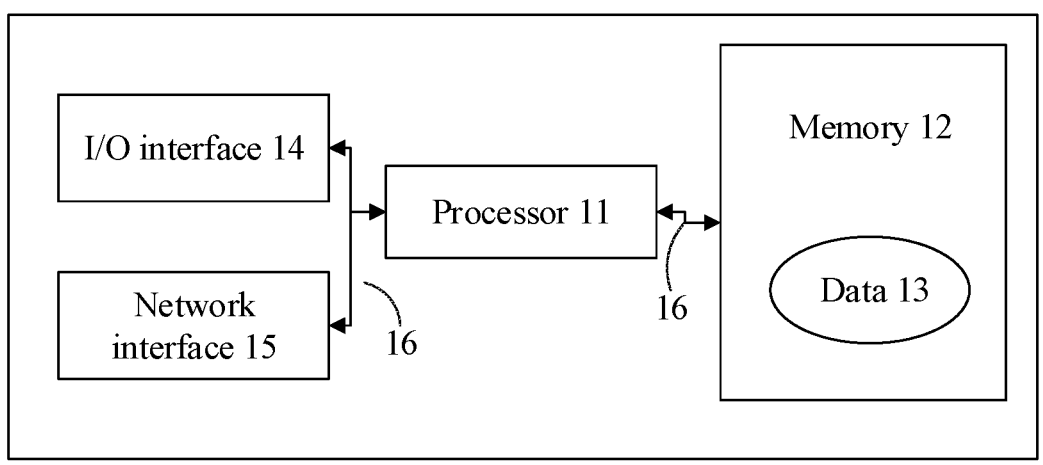
FIG. 11 is a schematic structural diagram of a computing device according to an embodiment of the present disclosure.

FIG. 11 is a schematic structural diagram of a computing device according to an embodiment of the present disclosure. The computing device is used to implement the various steps of the described methods. The computing device can be used to implement all or a portion of the methods shown in FIGS. 1 and 3-10. The computing device is only one example of suitable computing devices and is not intended to suggest any limitation as to the scope of use or functionality of the subject matter of the present disclosure.

Components of the computing device may include, but are not limited to, a processor 11, a memory 12, and a system bus 16 that couples various system components including the memory to the processor 11. The system bus 16 may be any of several types of bus structures, including a memory bus or a memory controller, a peripheral bus, and a local bus, using any of a variety of bus architectures. By way of example and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus also known as the interlayer bus.

The processor 11 may include a microprocessor, controller circuitry, etc., and may be configured to execute a computer program stored in the memory 12.

The memory 12 may include a wide variety of computer readable media. Computer readable media can be any available medium that can be accessed by a computing device and include both volatile and nonvolatile media, removable and non-removable media. By way of example and not limitation, computer readable media may comprise computer readable storage media and communication media. Computer readable storage media include volatile, nonvolatile media, removable and non-removable media implemented using methods or techniques for storing information such as computer readable instructions, data structures, program modules or other data. Computer readable storage media include, but is not limited to, random access memory (RAM), read only memory (ROM), EEPROM, flash memory or other memory technology, CD-ROM, digital versatile disk (DVD) or other optical disk storage, cartridge tape, tape, disk storage or other magnetic storage device, or any other medium that can be used to store the desired information and that can be accessed by the computing device. Communication media typically embody computer readable instructions, data structures, program modules or other data in a modulated data signal, such as a carrier wave or other transport mechanism, and include any information delivery media. The term "modulated data signal" means a signal that has one or more of its characteristics set or changed in such a manner that information is encoded in the signal. By way of example and not limitation, communication media may include a wired medium such as a wired network or a direct wired connection, and a wireless medium such as RF and other wireless medium. Combinations of any of the above are also included within the scope of computer readable media.

The memory 12 may include computer storage media in the form of volatile and/or nonvolatile memory such as ROM and RAM. A basic input/output system (BIOS) containing basic routines such as facilitating the transfer of information between elements within a computing device during startup is typically stored in ROM. The RAM typically contains data and/or program modules that are immediately accessible to the processor 11 and/or are currently being operated by the processor 11. By way of example and not limitation, data 13 that may be stored in the memory 12 shown in FIG. 11 may include a BIOS, an operating system, a computer program, other program modules, and program data. The computer program, when executed in the processor 11, causes the processor 11 to perform the method as previously described.

The computing device may also include other removable/non-removable, volatile/non-volatile computer storage media.

Other removable/non-removable, volatile/nonvolatile computer storage media that can be used in the exemplary operating environment include, but are not limited to, magnetic tape cassettes, flash memory cards, DVDs, digital video tapes, solid state RAMs, solid state ROMs, etc.

The computer storage media discussed above provide a computing device with storage of computer-executable instructions, data structures, program modules, and other data.

A user can enter commands and information into the computing device through an input device such as a keyboard and pointing device, commonly referred to as a mouse, a trackball or a touch pad. Other input devices may include a microphone, a joystick, a game pad, a satellite dish, a scanner, and the like. These and other input devices are typically coupled to the processor 11 via a user input output (I/O) interface 14 coupled to the system bus 16. A monitor or other type of display device can be connected to the system bus 16 via the user input output (I/O) interface 14, such as a video interface. In addition to the monitor, the computing device may also be connected to other peripheral output devices, such as a speaker and a printer, through the user input output (I/O) interface 14.

The computing device may be coupled to one or more remote computers via a network interface 15. The remote computer can be a personal computer, a server, a router, a network PC, a peer device, or other common network node, and typically includes many or all of the elements described above with respect to the computing device.

Embodiments of the present disclosure further provide a computer readable medium having stored thereon a computer program that, when executed on a processor, causes the processor to perform methods and functions in accordance with embodiments of the present disclosure. The computer readable medium can include any of the computer readable media described above.

Embodiments of the present disclosure further provide a computer program product that can implement the methods in accordance with the embodiments of the present disclosure when instructions in the computer program product are executed by a processor.

In the description of the present specification, the descriptions of the terms "an embodiment", "some embodiments", "an example", "a specific example", or "some examples" and the like mean that the specific features described in connection with the embodiments or examples, structures, materials or features are included in at least an embodiment or example of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be connected and combined.

Moreover, the terms "first" and "second" are used for descriptive purposes only and are not to be construed as indicating or implying relative importance or implicitly indicating the number of technical features indicated. Thus, features defining "first" or "second" may include at least one of the features, either explicitly or implicitly. In the description of the present disclosure, the meaning of "a plurality" is at least two, such as two, three, etc., unless specifically defined otherwise.

Any process or method description in the flow charts or otherwise described herein may be understood to represent a module, a segment or portion of code comprising one or more executable instructions for implementing the steps of a custom logic function or process. The scope of the preferred embodiments of the present disclosure includes additional implementations in which the functions may be performed in an order that is not shown or discussed, including in a substantially simultaneous manner or in the reverse order, depending on the function involved, which will be understood by those skilled in the art to which the embodiments of the present disclosure pertain.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A target detection model generation method, comprising:

adding perturbations to a pre-marked sample original box in an original image to obtain a plurality of sample selection boxes, wherein an image framed by the sample original box contains a target; and acquiring a plurality of positive samples from the original image by extracting images framed by the plurality of sample selection boxes;

acquiring from the original image a plurality of images that do not contain the target as negative samples; and generating a target detection model using a preset classification model algorithm according to the plurality of positive samples and the plurality of negative samples that were acquired;

wherein the generating the target detection model using the preset classification model algorithm according to the plurality of positive samples and the plurality of negative samples that were acquired comprises:

normalizing each of the plurality of positive samples and each of the plurality of negative samples;

performing, with a preset feature extraction algorithm, feature vector extraction on each of the positive samples and each of the negative samples that were normalized to obtain a positive sample feature training set and a negative sample feature training set, wherein the positive sample feature training set comprises extracted feature vectors of all the positive samples, and the negative sample feature training set comprises extracted feature vectors of all the negative samples; and training a plurality of weak classifiers according to the positive sample feature training set and the negative sample feature training set, wherein all the plurality of weak classifiers form the target detection model;

wherein the training the plurality of weak classifiers according to the positive sample feature training set and the negative sample feature training set comprises:

S1, initializing respective detection scores and weights corresponding to respective ones of the positive sample feature vectors in the positive sample feature training set, initializing respective detection scores and weights corresponding to respective ones of the negative sample feature vectors in the negative sample feature training set, and initializing quantity of the weak classifiers as t=0;

S2, setting up a storage structure and placing a root node into the storage structure, wherein the root node has a depth of 1, and the root node contains all the positive sample feature vectors and all the negative sample feature vectors;

S3, detecting whether there is an unprocessed node in the storage structure, proceeding to step S7 upon detection that there is no unprocessed node in the storage structure, and proceeding to step S4 otherwise;

S4, retrieving a node from the storage structure determining whether the node is splittable, proceeding to step S5 upon determination that the node is splittable, and proceeding to step S3 otherwise;

S5, determining a feature attribute and its corresponding feature threshold that are to be selected for splitting of the node;

S6, splitting all the feature vectors in the node into a left subset and a right subset according to the feature attribute and its corresponding feature threshold that were determined, adding two new nodes as child nodes of the node that respectively contain the left subset and the right subset, adding the two new nodes into the storage structure, and then proceeding to step S4;

S7, recording relevant information of all nodes to complete training of a weak classifier;

S8, executing t=t+1, determining whether t is greater than a preset threshold T, ending the training of the plurality of weak classifiers upon determination that t is greater than T, and proceeding to step S9 otherwise; and S9, updating, with the weak classifier for which the training is currently completed, the detection scores and the weights of the respective ones of the positive sample feature vectors in the positive sample feature training set and the respective ones of the negative sample feature vectors in the negative sample feature training set, and proceeding to step S2 with the detection scores and weights that were updated.

2. The target detection model generation method of claim 1, further comprising, between step S1 and step S3:

S2a, normalizing the weights of the respective ones of the positive sample feature vectors and the weights of the respective ones of the negative sample feature vectors.

3. The target detection model generation method of claim 1, wherein in step S1, a k1-th one of the positive sample feature vectors has a corresponding one of the weights that were initialized:

$$WP_{k1} = \frac{1}{2 \times NP},$$

the k1-th one of the positive sample feature vectors has a corresponding one of the detection scores that were initialized: $HP_{k1}=0$, a k2-th one of the negative sample feature vectors has a corresponding one of the weights that were initialized:

$$WN_{k2} = \frac{1}{2 \times NN},$$

the k2-th one of the negative sample feature vectors has a corresponding one of the detection scores that were initialized: $HP_{k2}=0$, $_{NP}$ is quantity of the positive samples, and NN is quantity of the negative samples, $k1 \in [1, NP]$, $k2 \in [1, NN]$.

4. The target detection model generation method of claim 1, wherein step S4 comprises:

S41, retrieving a node from the storage structure, and calculating a ratio RATIO of a sum of the weights of the positive sample feature vectors in the node to a total weight, and a node score SCORE, wherein $$RATIO = \frac{WPS}{WPS + WNS},$$

$$SCORE = \max\left(-p, \min\left(p, p \times \log\left(\frac{RATIO}{1 - RATIO}\right)\right)\right),$$

wherein WPS is the sum of the weights of the positive sample feature vectors in the node, WNS is a sum of the weights of the negative sample feature vectors in the node, and p is a constant greater than 0; and S42, determining whether the node satisfies condition a and condition b simultaneously, wherein condition a is DEPTH <MAXDEPTH, and condition b is TH≤RATIO≤1−TH, wherein DEPTH is a depth of the node, MAXDEPTH is a preset maximum depth of the node, and TH is a preset ratio threshold, wherein upon determination that the node satisfies condition a and condition b simultaneously in step S42, it is determined that the node is splittable, otherwise it is determined that the node is not splittable.

5. The target detection model generation method of claim 1, wherein step S5 comprises:

S51a, randomly selecting NF feature attributes, setting corresponding feature thresholds, and classifying the positive sample feature vectors and the negative sample feature vectors of the node for each of the feature attributes and its corresponding feature threshold to obtain NF feature classification results each containing a left subset and a right subset, wherein the threshold corresponding to an i-th one of the feature attributes is $TH_i$; , wherein upon performance of the classifying based on the i-th one of the feature attributes, the feature vector in the node for which the i-th one of the feature attributes has a feature value less than $TH_i$ is placed into the left subset, and the feature vector in the node for which the i-th one of the feature attributes has a feature value greater than or equal to $TH_i$, is placed into the right subset;

S52a, calculating respective classification scores SCORE_C of respective ones of the classification results:

SCORE_C=|WLP−WLN−WRP−WRN|, wherein WLP is a sum of the weights of the positive sample feature vectors in the left subset, WLN is a sum of the weights of the negative sample feature vectors in the left subset, WRP is a sum of the weights of the positive sample feature vectors in the right subset, and WRN is a sum of the weights of the negative sample feature vectors in the right subset; and S53a, selecting the feature attribute and the feature threshold that correspond to the classification result with a largest one of the classification scores, as the feature attribute and its corresponding feature threshold that are to be selected for splitting of the node.

6. The target detection model generation method of claim 1, wherein the acquiring the plurality of positive samples further comprises:

acquiring a respective position parameter vector L=(dx, dy, dw, dh) of each positive sample of the plurality of positive samples, wherein $$dx = \frac{x' - x}{w}$$

is an abscissa change rate, $$dy = \frac{y' - y}{h}$$

is an ordinate change rate, $$dw = \frac{w'}{w}$$

is a width change rate, $$dh = \frac{h'}{h}$$

is a height change rate, x and y are abscissa and ordinate of a center point of the original box of the positive sample, respectively, and w and h are width and height of the original box of the positive sample, respectively, x' and y' are abscissa and ordinate of a center point of the perturbation box of the positive sample, respectively, and w' and h' are width and height of the perturbation box of the positive sample, respectively.

7. The target detection model generation method of claim 6, wherein step S5 comprises:

S51b, randomly selecting NF feature attributes, setting corresponding feature thresholds, and classifying the feature vectors in the node for each of the feature attributes and its corresponding feature threshold to obtain NF feature classification results each containing a left subset and a right subset, wherein the feature threshold corresponding to an i-th one of the feature attributes is $TH_i$, i∈[1, NF], wherein upon performance of the classifying based on the i-th one of the feature attributes, the feature vector in the node for which the i-th one of the feature attributes has a feature value less than $TH_i$ is placed into the left subset, and the feature vector in the node for which the i-th one of the feature attributes has a feature value greater than or equal to $TH_i$ is placed into the right subset;

S52b, calculating respective classification scores SCORE_C respective ones of the classification results:

SCORE_C=|WLP−WLN−WRP−WRN|, wherein WLP is a sum of the weights of the positive sample feature vectors in the left subset, WLN is a sum of the weights of the negative sample feature vectors in the left subset, WRP is a sum of the weights of the positive sample feature vectors in the right subset, and WRN is a sum of the weights of the negative sample feature vectors in the right subset;

S53b, determining positive and negative attributes of the left subset and the right subset in each of the classification results, wherein in case of positive WLP−WLN−WRP+WRN, the left subset has a positive attribute and the right subset has a negative attribute, otherwise the left subset has a negative attribute and the right subset has a positive attribute;

S54b, calculating a regression error ERROR_R of the positive sample feature vectors in the subset with the positive attribute:

ERROR_R = Var(dx) + Var(dy) + Var(dw) + Var(dh), wherein $$\text{Var}(dx) = \frac{1}{N}\sum (dx_j - \overline{dx})^2,$$

$$\text{Var}(dy) = \frac{1}{N}\sum (dy_j - \overline{dy})^2,$$

$$\text{Var}(dw) = \frac{1}{N}\sum (dw_j - \overline{dw})^2,$$

$$\text{Var}(dh) = \frac{1}{N}\sum (dh_j - \overline{dh})^2,$$

N is quantity of the positive sample feature vectors in the subset with the positive attribute, dxj, dyj, dwj, dhj are respectively the abscissa change rate, the ordinate change rate, the width change rate, and the height change rate in the position parameter vector of the positive sample corresponding to a j-th one of the positive sample feature vectors in the subset with the positive attribute, and $\overline{dx}, \overline{dy}, \overline{dw}, \overline{dh}$ are respectively an average value of the abscissa change rates, an average value of the ordinate change rates, an average value of the width change rates, and an average value of the height change rates in the position parameter vector of the positive sample corresponding to the N positive sample feature vectors in the subset with the positive attribute;

S55b, calculating respective total scores SCORE_TOTAL of respective ones of the classification results:

SCORE_TOTAL=SCORE_C−λ*ERROR_R, wherein λ is a constant greater than 0; and

S56b, selecting the feature attribute and the feature threshold that correspond to the classification result with a largest one of the total scores as the feature attribute and its corresponding feature threshold that are to be selected for splitting of the node.

8. The target detection model generation method of claim 1, wherein in step S9, the detection score of the positive sample feature vector that was updated is $HP_{k1}' = HP_{k1} + hp_{k1}$, the detection score of the negative sample feature vector that was updated is $HN_{k2}' = HN_{k2} + hn_{k2}$, the weight of the positive sample feature vector that was updated is $$WP_{k1}' = \frac{\exp(-HP_{k1}')/NP}{2},$$

the weight of the negative sample feature vector that was updated is $$WN'_{k2} = \frac{\exp(HN'_{k2})/NN}{2},$$

wherein NP is quantity of the positive samples, NN is quantity of the negative samples, $HP_{k1}$ is the detection score of a current k1-th one of the positive sample feature vectors, $HN_{k2}$ is the detection score of a current k2-th one of the negative sample feature vectors, $hp_{k1}$ is a node score output by the weak classifier for which the training is currently completed when a k1-th one of the positive samples is input to the weak classifier, and $hn_{k2}$ is a node score output by the weak classifier for which the training is currently completed when a k2-th one of the negative samples is input to the weak classifier.

9. The target detection model generation method of claim 1, wherein the feature extraction algorithm comprises at least one of a directional gradient histogram feature extraction algorithm, a luminance chrominance color feature extraction algorithm, or a local binary pattern feature extraction algorithm.

10. A target detection method, comprising:
generating a target detection model using the generation method of claim 1;
normalizing an image for detection, and performing feature vector extraction using a preset feature extraction algorithm to obtain a feature vector for detection; and
classifying the feature vector for detection using the target detection model, and determining whether a target is contained in the image for detection based on a result of the classifying.

11. The target detection method of claim 10, wherein the classifying the feature vector for detection using the target detection model comprises:
classifying the feature vector for detection using each weak classifier of the target detection model individually, and acquiring a score of a node in the weak classifier into which the feature vector for detection is classified;
summing all node scores that were acquired to obtain a classifier total score S;
determining whether the classifier total score S is larger than a preset threshold score S', wherein upon determination that S>S', it is detected that the target is contained in the image for detection, otherwise it is detected that the target is not contained in the image for detection.

12. The target detection method of claim 10,
wherein the acquiring the plurality of positive samples further comprises:
acquiring a respective position parameter vector L=(dx, dy, dw, dh) of each positive sample of the plurality of positive samples,
wherein $$dx = \frac{x'-x}{w}$$

is an abscissa change rate, $$dy = \frac{y'-y}{h}$$

is an ordinate change rate, $$dw = \frac{w'}{w}$$

is a width change rate, $$dh = \frac{h'}{h}$$

is a height change rate,
x and y are abscissa and ordinate of a center point of the original box of the positive sample, respectively, and w and h are width and height of the original box of the positive sample, respectively,
x' and y' are abscissa and ordinate of a center point of the perturbation box of the positive sample, respectively, and w' and h' are width and height of the perturbation box of the positive sample, respectively,
wherein step S5 comprises:
S51b, randomly selecting NF feature attributes, setting corresponding feature thresholds, and classifying the feature vectors in the node for each of the feature attributes and its corresponding feature threshold to obtain NF feature classification results each containing a left subset and a right subset, wherein the feature threshold corresponding to an i-th one of the feature attributes is $TH_i$, i∈[1, NF], wherein upon performance of the classifying based on the i-th one of the feature attributes, the feature vector in the node for which the i-th one of the feature attributes has a feature value less than $TH_i$ is placed into the left subset, and the feature vector in the node for which the i-th one of the feature attributes has a feature value greater than or equal to $TH_i$ is placed into the right subset;
S52b, calculating respective classification scores SCORE_C of respective ones of the classification results:

SCORE_C=|WLP−WLN−WRP−WRN|, wherein WLP is a sum of the weights of the positive sample feature vectors in the left subset, WLN is a sum of the weights of the negative sample feature vectors in the left subset, WRP is a sum of the weights of the positive sample feature vectors in the right subset, and WRN is a sum of the weights of the negative sample feature vectors in the right subset;
S53b, determining positive and negative attributes of the left subset and the right subset in each of the classification results, wherein in case of positive WLP−WLN−WRP+WRN, the left subset has a positive attribute and the right subset has a negative attribute, otherwise the left subset has a negative attribute and the right subset has a positive attribute;
S54b, calculating a regression error $ERROR\_R$ of the positive sample feature vectors in the subset with the positive attribute:

ERROR_R = Var(dx) + Var(dy) + Var(dw) + Var(dh), wherein

-continued $$\mathrm{Var}(dx) = \frac{1}{N}\sum(dx_j - \overline{dx})^2,$$

$$\mathrm{Var}(dy) = \frac{1}{N}\sum(dy_j - \overline{dy})^2,$$

$$\mathrm{Var}(dw) = \frac{1}{N}\sum(dw_j - \overline{dw})^2,$$

$$\mathrm{Var}(dh) = \frac{1}{N}\sum(dh_j - \overline{dh})^2,$$

N is quantity of the positive sample feature vectors in the subset with the positive attribute, dxj, dyj, dwj, dhj are respectively the abscissa change rate, the ordinate change rate, the width change rate, and the height change rate in the position parameter vector of the positive sample corresponding to a j-th one of the positive sample feature vectors in the subset with the positive attribute, and $\overline{dx}, \overline{dy}, \overline{dw}, \overline{dh}$ are respectively an average value of the abscissa change rates, an average value of the ordinate change rates, an average value of the width change rates, and an average value of the height change rates in the position parameter vector of the positive sample corresponding to the N positive sample feature vectors in the subset with the positive attribute;

S55b, calculating respective total scores SCORE_TOTAL of respective ones of the classification results:

SCORE_TOTAL=SCORE_C−λ*ERROR_R, wherein λ is a constant greater than 0; and

S56b, selecting the feature attribute and the feature threshold that correspond to the classification result with a largest one of the total scores as the feature attribute and its corresponding feature threshold that are to be selected for splitting of the node, and wherein the classifying the feature vector for detection using the target detection model comprises:

classifying the feature vector for detection using each weak classifier of the target detection model individually, and acquiring a score of a node in the weak classifier into which the feature vector for detection is classified;

determining, for each weak classifier, whether a leaf node in the weak classifier into which the feature vector for detection is classified has a positive attribute, wherein upon determination that the leaf node has the positive attribute, an average value of the abscissa change rates, an average value of the ordinate change rates, an average value of the width change rates, and an average value of the height change rates are acquired that correspond to the leaf node;

summing all node scores that were acquired to obtain a classifier total score S';

determining whether the classifier total score S is greater than a preset threshold score wherein upon determination that S>S', it is detected that the target is contained in the image for detection;

upon detection that the target is contained in the image for detection, calculating a position parameter vector of the image for detection according to the average value of the abscissa change rates, the average value of the ordinate change rates, the average value of the width change rates, and the average value of the height change rates that were acquired; and adjusting a detection box that frames the image for detection according to the position parameter vector of the image for detection.

13. The target detection method of claim 12, wherein the position parameter vector corresponding to the target is $$L' = (dx', dy', dw', dh'),$$

wherein $$dx' = \frac{\sum_{k=1}^{T}(\overline{dx}(k)*\mathrm{SCORE}(k)*M(k))}{\sum_{k=1}^{T}(\mathrm{SCORE}(k)*M(k))},$$

$$dy' = \frac{\sum_{k=1}^{T}(\overline{dy}(k)*\mathrm{SCORE}(k)*M(k))}{\sum_{k=1}^{T}(\mathrm{SCORE}(k)*M(k))},$$

$$dw' = \frac{\sum_{k=1}^{T}(\overline{dw}(k)*\mathrm{SCORE}(k)*M(k))}{\sum_{k=1}^{T}(\mathrm{SCORE}(k)*M(k))},$$

$$dh' = \frac{\sum_{k=1}^{T}(\overline{dh}(k)*\mathrm{SCORE}(k)*M(k))}{\sum_{k=1}^{T}(\mathrm{SCORE}(k)*M(k))},$$

k denotes a serial number of the weak classifier, k being greater than or equal to 1 and less than T; M(k) denotes whether a leaf node in a k-th weak classifier into which the feature vector for detection is classified has a positive attribute, wherein in case of a positive attribute, M(k)=1, and in case of a negative attribute, M(k)=0; SCORE(k) is a node score of the leaf node in the k-th weak classifier into which the feature vector for detection is classified; $\overline{dx}(k), \overline{dy}(k), \overline{dw}(k),$ and $\overline{dh}(k)$ are respectively an average value of the abscissa change rates, an average value of the ordinate change rates, an average value of the width change rates, and an average value of the height change rates that correspond to the leaf node in the k-th weak classifier into which the feature vector for detection is classified, the detection box that was adjusted has an abscissa of X=x+w*dx', an ordinate of Y=y+h*dy', a width of W=w*dw', and a height of H=h*dh', wherein x, y are abscissa and ordinate of a center of the image for detection after the normalizing, respectively, w, h are width and height of the image for detection after the normalizing, respectively.

14. A computing device, comprising:

a processor; and a memory storing a computer program that, when executed by the processor, causes the processor to perform operations comprising:

adding perturbations to a pre-marked sample original box in an original image to obtain a plurality of sample selection boxes, wherein an image framed by the sample original box contains a target; and acquiring a plurality of positive samples from the original image by extracting images framed by the plurality of sample selection boxes;

wherein the generating the target detection model using the preset classification model algorithm according to the plurality of positive samples and the plurality of negative samples that were acquired comprises:

normalizing each of the plurality of positive samples and each of the plurality of negative samples;

performing, with a preset feature extraction algorithm, feature vector extraction on each of the positive samples and each of the negative samples that were normalized to obtain a positive sample feature training set and a negative sample feature training set, wherein the positive sample feature training set comprises extracted feature vectors of all the positive samples, and the negative sample feature training set comprises extracted feature vectors of all the negative samples; and training a plurality of weak classifiers according to the positive sample feature training set and the negative sample feature training set, wherein all the plurality of weak classifiers form the target detection model;

wherein the training the plurality of weak classifiers according to the positive sample feature training set and the negative sample feature training set comprises:

S1, initializing respective detection scores and weights corresponding to respective ones of the positive sample feature vectors in the positive sample feature training set, initializing respective detection scores and weights corresponding to respective ones of the negative sample feature vectors in the negative sample feature training set, and initializing quantity of the weak classifiers as t=0;

S2, setting up a storage structure and placing a root node into the storage structure, wherein the root node has a depth of 1, and the root node contains all the positive sample feature vectors and all the negative sample feature vectors;

S3, detecting whether there is an unprocessed node in the storage structure, proceeding to step S7 upon detection that there is no unprocessed node in the storage structure, and proceeding to step S4 otherwise;

S4, retrieving a node from the storage structure, determining whether the node is splittable, proceeding to step S5 upon determination that the node is splittable, and proceeding to step S3 otherwise;

S5, determining a feature attribute and its corresponding feature threshold that are to be selected for splitting of the node;

S6, splitting all the feature vectors in the node into a left subset and a right subset according to the feature attribute and its corresponding feature threshold that were determined, adding two new nodes as child nodes of the node that respectively contain the left subset and the right subset, adding the two new nodes into the storage structure, and then proceeding to step S4;

S7, recording relevant information of all nodes to complete training of a weak classifier;

S8, executing t=t+1, determining whether t is greater than a preset threshold T, ending the training of the plurality of weak classifiers upon determination that t is greater than T, and proceeding to step S9 otherwise; and S9, updating, with the weak classifier for which the training is currently completed, the detection scores and the weights of the respective ones of the positive sample feature vectors in the positive sample feature training set and the respective ones of the negative sample feature vectors in the negative sample feature training set, and proceeding to step S2 with the detection scores and weights that were updated.

15. A non-transitory computer readable medium storing a computer program that, when executed by a processor, causes the processor to perform operations comprising:

adding perturbations to a pre-marked sample original box in an original image to obtain a plurality of sample selection boxes, wherein an image framed by the sample original box contains a target; and acquiring a plurality of positive samples from the original image by extracting images framed by the plurality of sample selection boxes;

wherein the generating the target detection model using the preset classification model algorithm according to the plurality of positive samples and the plurality of negative samples that were acquired comprises:

normalizing each of the plurality of positive samples and each of the plurality of negative samples;

performing, with a preset feature extraction algorithm, feature vector extraction on each of the positive samples and each of the negative samples that were normalized to obtain a positive sample feature training set and a negative sample feature training set, wherein the positive sample feature training set comprises extracted feature vectors of all the positive samples, and the negative sample feature training set comprises extracted feature vectors of all the negative samples; and training a plurality of weak classifiers according to the positive sample feature training set and the negative sample feature training set, wherein all the plurality of weak classifiers form the target detection model;

wherein the training the plurality of weak classifiers according to the positive sample feature training set and the negative sample feature training set comprises:

S1, initializing respective detection scores and weights corresponding to respective ones of the positive sample feature vectors in the positive sample feature training set, initializing respective detection scores and weights corresponding to respective ones of the negative sample feature vectors in the negative sample feature training set, and initializing quantity of the weak classifiers as t=0;

S2, setting up a storage structure and placing a root node into the storage structure, wherein the root node has a depth of 1, and the root node contains all the positive sample feature vectors and all the negative sample feature vectors;

S3, detecting whether there is an unprocessed node in the storage structure, proceeding to step S7 upon detection that there is no unprocessed node in the storage structure, and proceeding to step S4 otherwise;

S4, retrieving a node from the storage structure, determining whether the node is splittable, proceeding to step S5 upon determination that the node is splittable, and proceeding to step S3 otherwise;

S5, determining a feature attribute and its corresponding feature threshold that are to be selected for splitting of the node;

S6, splitting all the feature vectors in the node into a left subset and a right subset according to the feature attribute and its corresponding feature threshold that were determined, adding two new nodes as child nodes of the node that respectively contain the left subset and the right subset, adding the two new nodes into the storage structure, and then proceeding to step S4;

S7, recording relevant information of all nodes to complete training of a weak classifier, S8, executing t=t+1, determining whether t is greater than a preset threshold T, ending the training of the plurality of weak classifiers upon determination that t is greater than T, and proceeding to step S9 otherwise; and S9, updating, with the weak classifier for which the training is currently completed, the detection scores and the weights of the respective ones of the positive sample feature vectors in the positive sample feature training set and the respective ones of the negative sample feature vectors in the negative sample feature training set, and proceeding to step S2 with the detection scores and weights that were updated.

* * * * *